United States Patent
Zhu et al.

(10) Patent No.: US 11,772,666 B2
(45) Date of Patent: Oct. 3, 2023

(54) VEHICLE OPERATION SAFETY MODEL TEST SYSTEM

(71) Applicant: Mobileye Vision Technologies Ltd., Jerusalem (IL)

(72) Inventors: Qianying Zhu, Beijing (CN); Lidan Zhang, Beijing (CN); Xiangbin Wu, Beijing (CN); Xinxin Zhang, Beijing (CN); Fei Li, Beijing (CN)

(73) Assignee: Mobileye Vision Technologies Ltd., Jerusalem (IL)

( * ) Notice: Subject to any disclaimer, the term of this patent is extended or adjusted under 35 U.S.C. 154(b) by 0 days.

(21) Appl. No.: 17/789,426

(22) PCT Filed: Dec. 17, 2021

(86) PCT No.: PCT/IB2021/000886
§ 371 (c)(1),
(2) Date: Jun. 27, 2022

(87) PCT Pub. No.: WO2022/130019
PCT Pub. Date: Jun. 23, 2022

(65) Prior Publication Data
US 2023/0043905 A1    Feb. 9, 2023

Related U.S. Application Data

(63) Continuation of application No. PCT/CN2020/137375, filed on Dec. 17, 2020.

(51) Int. Cl.
*B60W 50/02* (2012.01)
*B60W 60/00* (2020.01)
(Continued)

(52) U.S. Cl.
CPC ...... *B60W 50/0205* (2013.01); *B60W 30/162* (2013.01); *B60W 30/165* (2013.01);
(Continued)

(58) Field of Classification Search
CPC .............................. B60W 30/50; B60W 30/60
See application file for complete search history.

(56) References Cited

U.S. PATENT DOCUMENTS 9,493,161 B2 * 11/2016 Johansson .............. B60K 31/00
10,427,656 B2 * 10/2019 Zhang ....................... B60T 7/12
(Continued)

FOREIGN PATENT DOCUMENTS

| CN | 110597711 | 12/2019 |
| CN | 110928319 | 3/2020 |

(Continued)

OTHER PUBLICATIONS

"international Application Serial No. PCT/B2021/000886, International Search Report dated Apr. 4, 2022", 2 pgs.
(Continued)

*Primary Examiner* — Jonathan M Dager
(74) *Attorney, Agent, or Firm* — Schwegman Lundberg & Woessner, P.A.

(57) ABSTRACT

System and techniques for test scenario verification, for a simulation of an autonomous vehicle safety action, are described. In an example, measuring performance of a test scenario used in testing an autonomous driving safety requirement includes: defining a test environment for a test scenario that tests compliance with a safety requirement including a minimum safe distance requirement; identifying test procedures to use in the test scenario that define actions for testing the minimum safe distance requirement; identifying test parameters to use with the identified test procedures, such as velocity, amount of braking, timing of braking, and rate of acceleration or deceleration; and creating the test scenario for use in an autonomous driving test simulator. Use of the test scenario includes applying the identified test procedures and the identified test parameters to identify a
(Continued)

response of a test vehicle to the minimum safe distance requirement.

26 Claims, 8 Drawing Sheets

(51) Int. Cl.
 *B60W 30/16* (2020.01)
 *B60W 30/165* (2020.01)
(52) U.S. Cl.
 CPC ..... *B60W 60/0015* (2020.02); *B60W 2520/00* (2013.01); *B60W 2552/00* (2020.02); *B60W 2554/404* (2020.02)

(56) References Cited

U.S. PATENT DOCUMENTS

| | | | |
|---|---|---|---|
| 11,066,072 B2* | 7/2021 | Kim | B60W 40/04 |
| 2010/0280729 A1* | 11/2010 | Samsioe | B60W 10/196 701/93 |
| 2011/0137631 A1 | 6/2011 | Komatsu et al. | |
| 2018/0148063 A1* | 5/2018 | Tatsushiro | B60W 30/18009 |
| 2019/0337507 A1* | 11/2019 | Stein | B60W 50/0097 |
| 2019/0377352 A1* | 12/2019 | Weißwange | B60W 60/0027 |
| 2019/0391259 A1* | 12/2019 | Shimizu | B60W 30/16 |
| 2020/0023845 A1 | 1/2020 | Wang | |
| 2020/0377109 A1 | 12/2020 | Yang | |
| 2021/0110484 A1* | 4/2021 | Shalev-Shwartz | B60W 10/18 |
| 2021/0269065 A1* | 9/2021 | Haggblade | B60W 30/18154 |
| 2022/0016939 A1* | 1/2022 | Doraiswamy | G06N 3/084 |
| 2022/0017090 A1* | 1/2022 | Sams | B60C 99/006 |
| 2022/0227367 A1* | 7/2022 | Kario | B60W 30/0956 |
| 2022/0315052 A1* | 10/2022 | Oboril | B60W 60/00274 |
| 2022/0379894 A1* | 12/2022 | Itoh | G08G 1/09 |
| 2023/0028035 A1* | 1/2023 | Haggblade | B60W 50/00 |

FOREIGN PATENT DOCUMENTS

| | | |
|---|---|---|
| CN | 112014115 | 12/2020 |
| DE | 102019124615 | 3/2020 |
| WO | WO-2019053068 A1 | 3/2019 |
| WO | WO-2022130019 A1 | 6/2022 |

OTHER PUBLICATIONS

"International Application Serial No. PCTAB2021/000886, Written Opinion dated Apr. 4, 2022", 3 pgs.
"Chinese Application Serial No. 202180015179.6, Office Action dated May 25, 2023", w English Claims, 21 pgs.

* cited by examiner

US 11,772,666 B2

VEHICLE OPERATION SAFETY MODEL TEST SYSTEM

PRIORITY CLAIM

This application is a U.S. National Stage Application under 35 U.S.C. 371 from International Application No. PCT/IB2021/000886, filed Dec. 17, 2021, and published as WO 2022/130019 on Jun. 23, 2022, which is a claims the benefit of priority to International Application No. PCT/CN2020/137375, filed Dec. 17, 2020, each of which are incorporated herein by reference in their entirety.

TECHNICAL FIELD

Embodiments described herein generally relate to automated driving or driver assisted driving and more specifically to a test system for ensuring compliance with parameters of one or more safety models.

BACKGROUND

Autonomous driving and driver assistance systems are becoming more common place. These systems use vehicle sensor data to control, or help control (e.g., via driver prompts, partial steering input, emergency braking, etc.) the vehicle. Autonomous driving systems can fully control the vehicle without driver assistance, whereas assisted driving systems augment a driver's control of the vehicle. Assisted driving systems may be referred to as advanced driver assistance systems (ADAS) systems, developed to automate, adapt, or enhance vehicle systems to increase safety and provide better driving. In such systems, safety features are designed to avoid collisions and accidents by offering technologies that alert the driver to potential problems, or to avoid collisions by implementing safeguards and taking over control of the vehicle.

While autonomous driving and ADAS systems have incorporated various safety features, there is movement to create verifiable safety models for the operation of vehicles. These models tend to formalize the parameters of motion and interaction between vehicles, use those parameters to model vehicle presence in the world, and define acceptable interactions between vehicles based on the vehicle presence. One such vehicle operation safety model (VOSM) is Responsibility-Sensitive Safety (RSS).

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
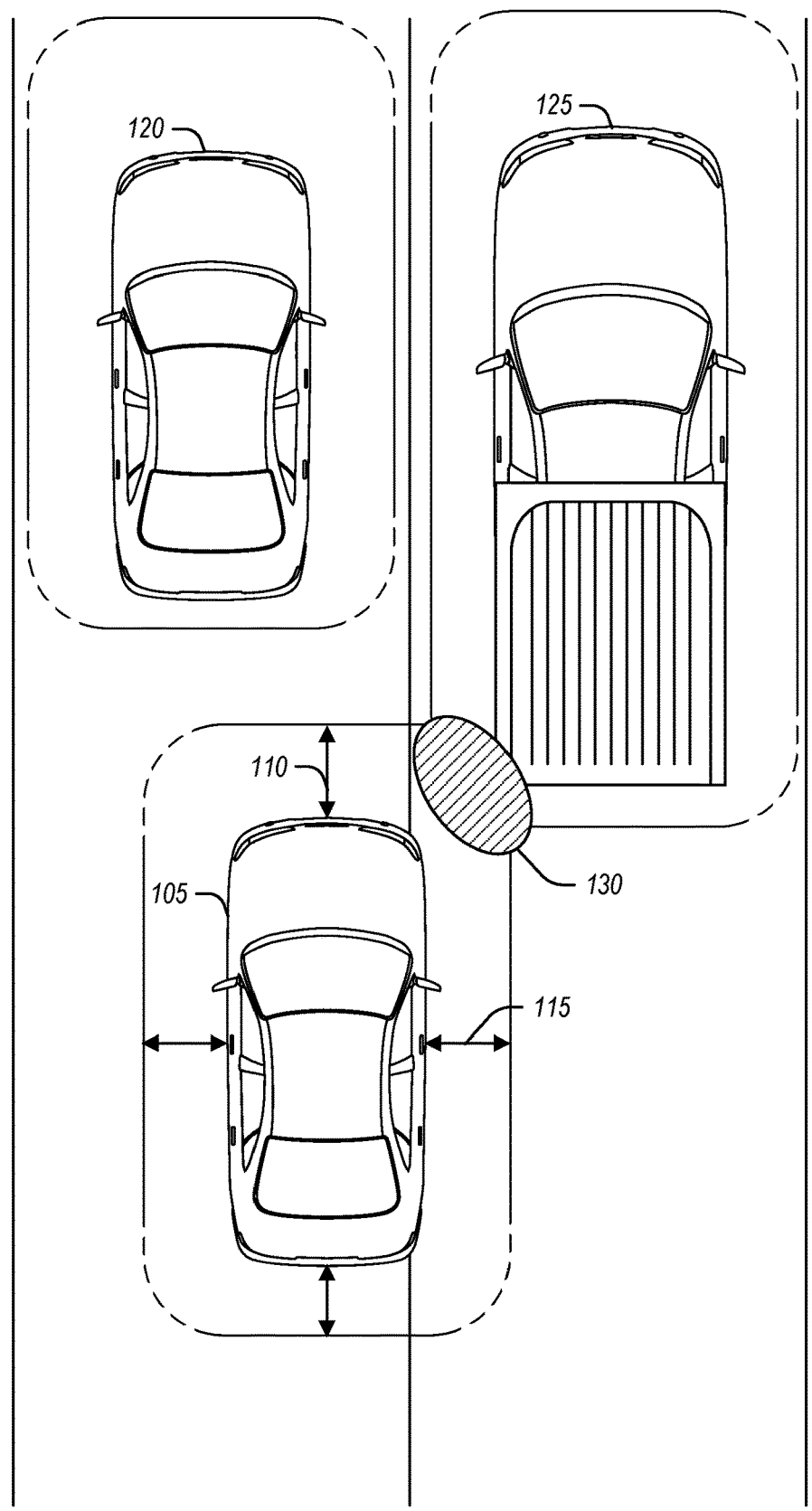
FIG. 1 illustrates an example of a moving vehicle scenario demonstrating an autonomous vehicle operation safety model, according to an embodiment.

Many of the scenarios and examples discussed below will reference RSS and safety standards based on RSS principles, although most examples are equally applicable to other VOSMs. VOSMs such as RSS define several parameters of individual vehicles and uses these parameters to model, among other things, a set of distances which determine whether a vehicle is safe or not. Generally, the safe distances address sufficient longitudinal distance and sufficient lateral distance. This is discussed below with reference to FIG. 1, which explains the relation of these distances in a safety model.

A VOSM may provide a mathematical model for safety assurance during autonomous driving. For instance, RSS formulates a set of safety standards, such as the minimum distance $d_{min}$ between vehicles to avoid collisions. Multiple parameters are used to calculate the formulation, such as response time $\rho$, minimum braking $a_{min,brake}$, and maximum acceleration $a_{max,brake}$ of the vehicle. If all requirements are satisfied, the vehicle passes the standard and is believed to be safe (e.g., believed to be in a state where it would not be at fault for an accident). It should be noted that such standards are not intended to guarantee absolute safety, rather such standards only assure that the vehicle that is control according to the safety model rules will not cause an accident of its own fault. Safety models such as RSS also rely on a set of assumptions regarding what should be considered to be a "reasonable" or typical behavior of other road actors (such as maximum acceleration for a target vehicle during response time, etc.). Thus, even full compliance with safety model rules does not guarantee that accidents caused by other actors will not happen.

Various forms of safety requirements are being developed to standardize RSS approaches. For example, the China ITS standard "Technical Requirement of Safety Assurance of AV Decision Making" (T/ITS 0116-2019) establishes an RSS-based safety standard for use in in China. To advance the usage of this standard, testing standards are also being developed, such as the China ITS standard "Test Procedures and Evaluation Rules for Safety Assurance of AV Decision Making" (T/ITS 0116-2019). It is expected that this and similar testing standards will require execution of three parts: simulation test, field test and road test. The simulation test will be executed first before field test and road test. The following proposes a simulation testbed to address the following problems involved with existing testing approaches and infrastructures for simulation tests.

In many scenarios, it is a challenge to invoke safety model-specific test flows and working condition parameters. AV developers usually use some typical traffic scenarios as test cases to test the performance of an autonomous driving system (ADS), such as by following a leading vehicle, lane changing, crossing road intersection, etc. The working condition parameters for these scenarios are derived from real traffic data, or randomly chosen by the scenario designers. However, these test cases together with their working condition parameters typically cannot be used for testing compliance with RSS directly, because such scenarios do not have direct numerical relationships with the RSS rules, and do not reflect the real-world capability of an RSS functional module (as implemented by different vendors).

To address this scenario, the following proposes safety model-specific test cases together with specific working condition parameters for safety model test verification. In an example verification process, all working condition parameters are calculated backward from an RSS safety formula. Additionally, in order to accurately evaluate and quantize the test result, the following proposes safety model-specific criteria which can reflect the actual capability of a functional safety module under test. Further, the following proposes model-specific functional safety modules which can enhance a conventional AV simulation test system and allow its adaptation for meeting the requirements of a VOSM test scenario.

FIG. 1 illustrates an example of a moving vehicle scenario demonstrating an autonomous vehicle operation safety model, according to an embodiment. As illustrated, an ego vehicle 105 shares the road with two target vehicles, the sedan 120 and the truck 125. Here, "ego vehicle" refers to the vehicle from which a certain perspective is obtained and a target vehicle is a subject within that perspective.

The vehicle 105, which may also be referred to interchangeably as an "ego vehicle", "host vehicle", or "test vehicle", may be any type of vehicle, such as a commercial vehicle, a consumer vehicle, a recreation vehicle, a car, a truck, a motorcycle, a boat, a drone, a robot, an airplane, a hovercraft, or any mobile craft able to operate at least partially in an autonomous mode. The vehicle 105 may operate at some times in a manual mode where the driver operates the vehicle 105 conventionally using pedals, a steering wheel, or other controls. At other times, the vehicle 104 may operate in a fully autonomous mode, where the vehicle 105 operates without user intervention. In addition, the vehicle 105 may operate in a semi-autonomous mode, where the vehicle 105 controls many of the aspects of driving, but the driver may intervene or influence the operation using conventional (e.g., steering wheel) and non-conventional inputs (e.g., voice control). In this fashion, the vehicle may operate at the same or different times among any number of driving automation levels, defined from Level 1 to Level 5 (e.g., as defined by SAE International J3016: Level 1, Driver Assistance; Level 2, Partial Driving Automation; Level 3, Conditional Driving Automation; Level 4, High Driving Automation; Level 5, Full Driving Automation). The vehicle may also operate using combinations or variations of these levels. For instance, the vehicle may operate according to a new concept, L2+(Level 2 Plus), which describes a type of hybrid ADAS/AV to facilitate enhanced driving experience and boost safety without the need to provide a fully autonomous control system.

As noted above, safety models such as RSS provide a mathematical model for safety assurance during automatous driving. A VOSM may formulate a set of safety standards, such as the minimum distance $d_{min}$ between vehicles to avoid collisions. Multiple parameters can be used to calculate the formulation, such as response time $\rho$, minimum braking $a_{min,brake}$ and maximum acceleration $a_{max,brake}$ of the vehicle. Thus, the safety model may define a safe longitudinal distance 110 and a safe lateral distance 115 for the ego vehicle 105. These distances create a zone, shell, bubble, or shield around the ego vehicle 105, also illustrated around the sedan 120 and the truck 125. Generally, violation of these safe distances (e.g., intersection or overlap 130) indicates that the ego vehicle 105 is not safe and should take corrective action. Note that the intersection 130 need not result in a collision, merely that, according to the safety model, an unsafe situation has arisen.

As a non-limiting example, the RSS model provides the following representations of safe longitudinal and lateral distances respectively:

$$d_{min} = \left[ v_r\rho + \frac{1}{2}a_{max,accel}\rho^2 + \frac{(v_r + \rho a_{max,accel})^2}{2a_{min,brake}} - \frac{v_f^2}{2a_{max,brake}} \right]_+ \quad \text{Equation (1)}$$

$$d_{min} = \mu + \left[ \frac{2v_1 + \rho_1 a_{1,max,accel}^{lat}}{2}\rho_1 + \frac{(v_1 + \rho_1 a_{1,max,accel}^{lat})^2}{2a_{1,min,brake}^{lat}} - \left( \frac{2v_2 - \rho_2 a_{2,max,accel}^{lat}}{2}\rho_2 - \frac{(v_2 - \rho_2 a_{2,max,accel}^{lat})^2}{2a_{2,min,brake}^{lat}} \right) \right]_+ \quad \text{Equation (2)}$$

With respect to the safe longitudinal distance of Equation (1), $a_{max,accel}$ and $a_{min,brake}$ are the maximum acceleration rate and minimum braking rate of the ego vehicle 105 ($c_r$), and $\rho$ is the response time of the ego vehicle 105. With respect to the safe lateral distance of equation (2), $\rho_1$ and $\rho_2$ are the response time of the ego vehicle 105 ($c_1$) and a target vehicle ($c_2$) such as the truck 125. Also, $a_{1,max,accel}^{lat}$ and $a_{1,min,brake}^{lat}$ are respectively the maximum acceleration rate and minimum braking rate of $c_1$, $a_{2,max,accel}^{lat}$ and $a_{2,min,brake}^{lat}$ are respectively the maximum acceleration rate and minimum braking rate of $c_2$.

For clarity, the result from Equation (1) is referred to as the minimum safe longitudinal distance and the result from Equation (2) is referred to as the minimum safe lateral distance, with either value being implemented as a minimum safe distance requirement. When the ego vehicle detects that it is closer than either the minimum safe longitudinal distance or the minimum safe lateral distance, the ego vehicle 105 is expected to implement a corrective action. Such corrective actions may include braking or turning to increase the distance between the ego vehicle 105 and the target vehicle 125 or other object until the minimum safe longitudinal distance and the minimum safe lateral distance are restored.

Equations (1) and (2) above illustrate the parameterization of the safety model to response times of the ego vehicle 105 and the target vehicle 125, maximum lateral or longitudinal acceleration of the target vehicle and minimum braking (e.g., deceleration) of the ego vehicle. Here, maximum acceleration is the greatest acceleration capable by a vehicle and minimum braking is the deacceleration a vehicle can guarantee will be applied when executing a maneuver. Thus, if the vehicle is in peak operating condition, the maximum and minimum braking may be the same. However, if, for example, the ego vehicle 105 has worn brakes, the minimum braking for the ego vehicle 105 is reduced from the maximum braking based on the brake wear.

Actual values used for the maximum and minimum of either braking or acceleration are generally defined by a manufacturer of the ego vehicle 105, or defined by the VOSM, among other places. These values are defined to provide a realistic safety margin given equations (1) and (2). It is noted that the equations (1) and (2) generally assume a worst case scenario in which the ego vehicle 105 is underperforming (thus the use of the minimum braking for the ego vehicle) and the target vehicle 125 is at peak performance (thus the use of maximum acceleration—or maximum deceleration/braking where appropriate—for the target vehicle 125) even though it is more likely that the ego vehicle 105 will outperform its minimum braking and the target vehicle 125 will underperform its maximum acceleration/braking.

By using the Equations (1) and (2), the danger zone is defined around the ego vehicle 105. As noted above, when another object interferes with this zone, or is projected to interfere with the zone, then the ego vehicle 105 is expected to take action. Because the velocities of both the ego vehicle 105 and the target vehicle 125 are parameters of equations (1) and (2), the danger zone is constantly changing based on the detected movement of the ego vehicle 105 and the target vehicle 125.

Other VOSMs will generally follow the RSS VOSM template described above by defining relevant parameters and providing for acceptable vehicle interactions based on those parameters.

A simulation testbed commonly includes a simulator, scenario engine, data logging, and rating. A variety of driving simulators, such as CARLA, MATLAB, and others, have been widely adopted for use. Each simulator has its own scenario engine, such as scenario runner for CARLA, or scenario designer of MATLAB. The criteria for such test scenarios usually include safety, task completion, driving smoothness, compliance of traffic policy etc. The test cases used in simulation often involve typical traffic scenarios, such as lane changing, following a leading vehicle, crossing road intersections, etc. The simulation working condition parameters are usually derived from real traffic data, such as Natural Driving Study (NDS), or randomly chosen by designers The traditional test cases together with their working condition parameters cannot be used to directly evaluate RSS or another VOSM functionality. Safety model rules are based on rigorous mathematical formulas and have their own operational domain. The test cases and parameters, to be successful, must meet the operation domain of safety model functional units and reflect the actual capability of a safety model functional unit under test. However, conventional simulation testbeds lack essential functional modules for RSS and other VOSM test and rating.

The following proposes safety-model-specific test cases together with specific working condition parameters for safety model testing. In an example, working condition parameters are calculated backward from formulas, and deployed into test scenarios. The following also proposes safety model-specific functional modules which can be embedded into a conventional simulation system for safety model simulation and rating, including the use of a safety model-specific real time kinematics (RTK) status checker and a safety model-based rating module which produces relevant rating criteria.

The proposed safety model-specific test method and working condition parameters can be used for verifying compliance with a formalized safety model test standard, or other similar types of standards which are under development. The proposed safety model-specific functional modules are also adapted for use in a qualified safety model simulation testbed and for use with a commercial test system used for verifying safety model standard compliance. It will be apparent that other scenarios and benefits of the following architectures and methods may also be provided.

Figure 2:
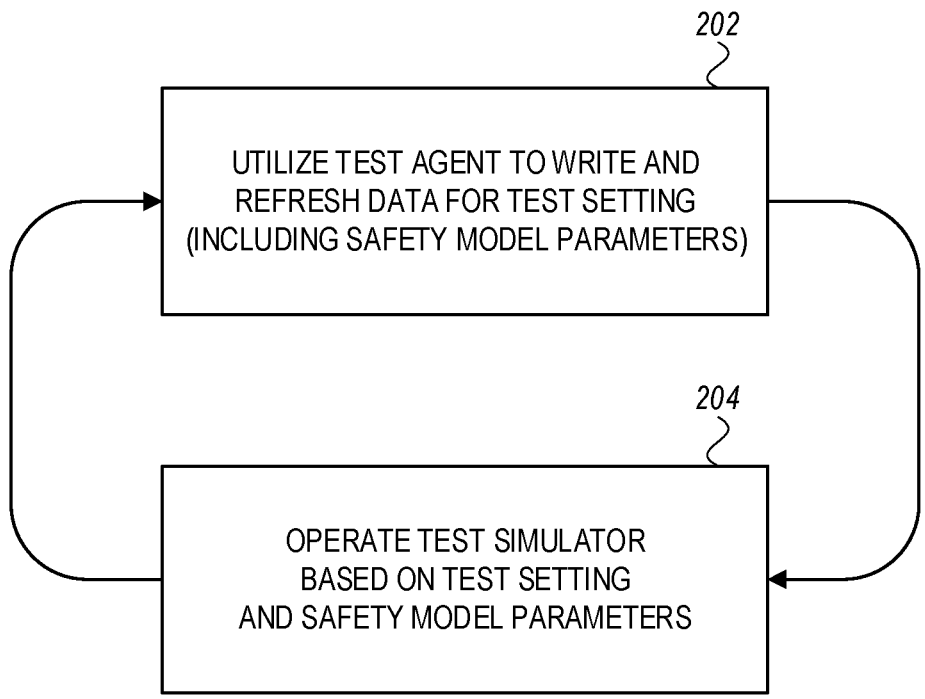
FIG. 2 illustrates an example workflow for operating a safety model simulation testbed, according to an embodiment.

FIG. 2 illustrates an example workflow for operating a safety model simulation testbed, according to an embodiment. Specifically, this workflow involves the use of a test agent (at operation 202) to write and refresh data for a test setting, including providing safety model parameters to test compliance with some safety model requirement. This workflow is then followed by operation of the test simulator, based on the test setting and the safety model parameters (at operation 204).

The testing examples used herein specifically verify the compliance with RSS standards such as those relating to safe longitudinal distance, although other VOSMs or specific safety scenarios may also be used. For example, a safe lateral distance as defined by RSS may be verified, or vehicle trajectory intercepts (e.g., intersections, overlaps, etc.) from other VOSMs may be verified with appropriate adjustment of the parameters.

According to the current version of RSS, the minimum longitudinal safe distance is defined by equation (1), reproduced below:

$$d_{min}^{long} = \left[ v_r \rho + \frac{a_{max,accel}^{long} \rho^2}{2} + \frac{(v_r + \rho a_{max,accel}^{long})^2}{2 d_{min,brake}^{long}} - \frac{v_f^2}{2 d_{max,brake}^{long}} \right]_+$$

here the notation $[X]_+ := \max\{x, 0\}$, and where:

$v_f$: longitudinal speed of the front vehicle;
$a_{max,brake}^{long}$: the maximum braking acceleration of the front vehicle;
$v_r$: the longitudinal speed of the rear vehicle;
$\rho$: the response time of the rear vehicle;
$a_{max,accel}^{long}$: the maximum forward acceleration of the rear vehicle;
$a_{min,brake}^{long}$: the minimum braking acceleration of the rear vehicle.

When the distance between the rear vehicle and the front vehicle equal or less than the minimum longitudinal safe distance, the rear vehicle should continue advancing with the acceleration no more than the maximum longitudinal acceleration ($a_{max,brake}^{long}$) during the response time, then the rear vehicle should decelerate with the braking acceleration no less than the minimum longitudinal braking acceleration ($a_{min,brake}^{long}$) until the rear vehicle is completely stopped or the longitudinal dangerous situation is released (e.g., there is no more longitudinal dangerous situation).

Given the above, the test technique may be adapted to verify the compliance of a safety module which attempts to detect and respond to unsafe conditions, and comply with RSS or other VOSM requirements.

Figure 3:
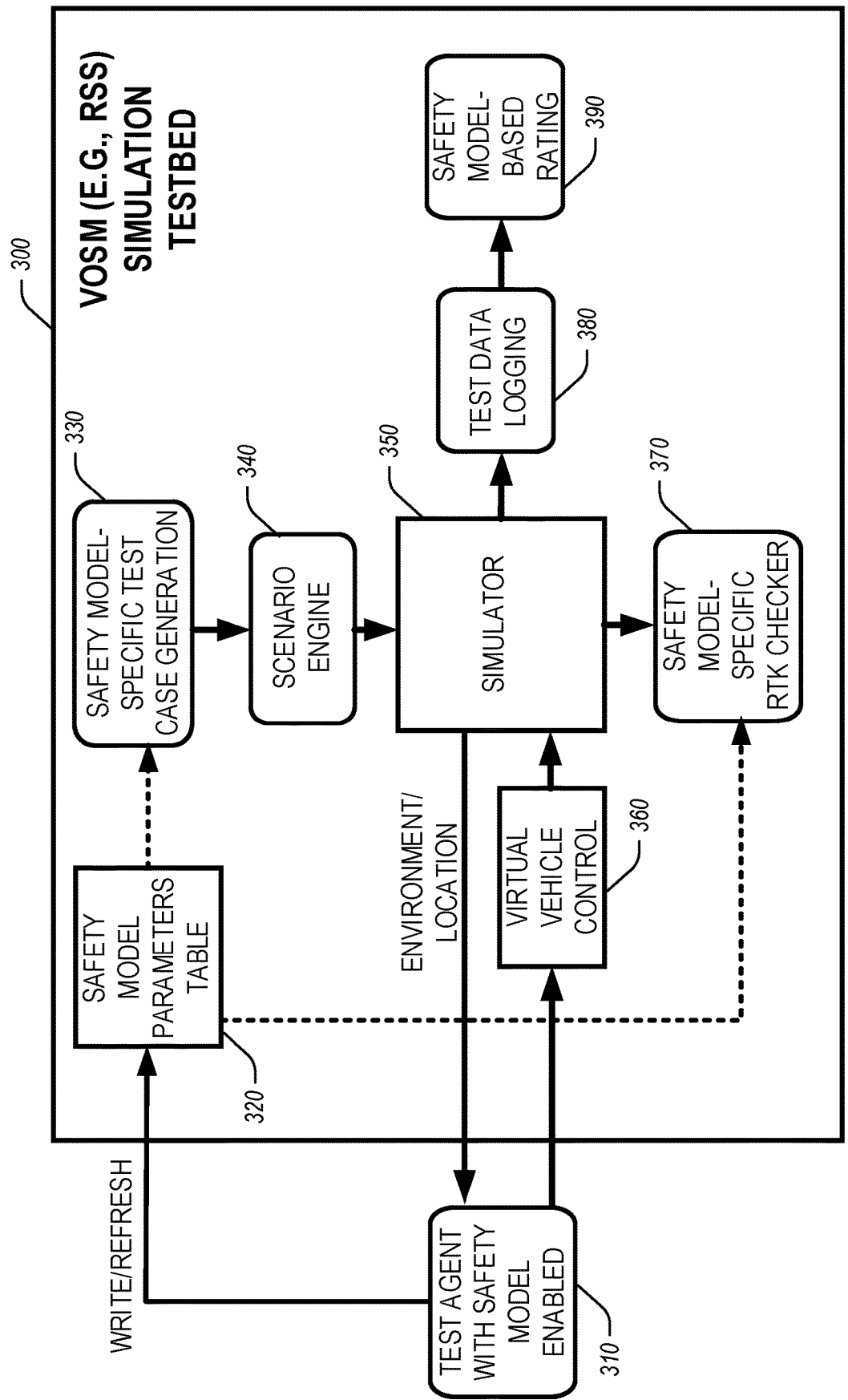
FIG. 3 illustrates an example of a system framework for a safety model simulation testbed, according to an embodiment.

FIG. 3 illustrates a system framework of a proposed simulation testbed (e.g., using RSS as the VOSM). The functional modules of the simulation testbed 300 (e.g., implemented in hardware with software programming) may include the following components:

a) Simulator 350. This simulator 350 may be provided by any of a number of professional driving simulators, including CARLA, MATLAB, Apollo etc. The simulator renders 3D virtual scene in real time, calculates real time kinematics of a virtual vehicle, and provides a control interface to user.

b) Scenario engine 340. The scenario engine 340 parses scenario specifications and then builds a test scenario in the simulator 350. The scenario engine 340 can be independent from the simulator 350 or be embedded in the simulator 350.

c) Test data logging 380. This module records all runtime data during simulation, including a status of the ego vehicle and other actors, events (collision, violation of traffic policy, etc.) and environment information. The data log can be used for replay, debug and performance assessment.

d) Virtual vehicle control 360. This module is used to convert an output from a test agent 310 to a control signal of the virtual vehicle (throttle/brake/wheel, or target speed/acceleration/waypoint).

A traditional AD simulation infrastructure lacks functional modules for safety model testing; thus, the following introduces use of additional safety model-specific functional modules in the testbed 300, to enable a test to the specific VOSM model (e.g., RSS model). These modules include use and involvement of safety model parameters, as introduced in detail as below.

e) Safety model parameters table 320. As noted with reference to FIG. 1 and the discussion of Equations (1) and (2), a core idea of RSS is to maintain a safe longitudinal distance and a safe lateral distance for the ego vehicle. The parameters for the safety model, such as the parameters used in Equations (1) and (2), discussed above, are referred to in the following paragraphs as safety model parameters.

The value of the safety model parameters depends on multiple factors, including the real dynamic characteristics of the ego vehicle under test, driving environment, road condition, and experimental result. Each test agent from different vendors has its own mechanism to determine the safety model parameters. Depending on the specific implementation, the safety model parameters can be a set of fixed values, or can be adaptively adjusted according to environments or road conditions.

The safety model parameters table 320 is used to receive the safety model parameters values from a test agent under test and store them in a table during the simulation test. If the test agent 310 uses a set of fixed safety model parameter values, the table will be written only once at the beginning; if the test agent uses a set of adaptive safety model parameters, the table needs to be refreshed in real time.

Additionally, the safety model parameters table can be used by other modules for different purposes, which will be introduced in the next sections.

f) Safety model-specific test case generation 330. This module 330 is used to generate safety model-specific test cases together with their simulation working conditions parameters according to the safety model parameters table. In order to assess the performance of safety model functionality in a test agent, the following three safety model test cases may be generated:

1) Steady state test. This steady state test is designed to test if the ego vehicle and the target vehicle can achieve a relatively steady state during normal driving, which means they have the same velocity and the distance between them stays basically unchanged. The test flow for a steady state test is described as follows:

Step 1: The ego vehicle and target vehicle together with other actors start driving at some initial conditions (initial location, initial velocity and initial acceleration) along a given route.

Step 2: The target vehicle keeps driving along the route at constant velocity, and the ego vehicle approaches the target vehicle either longitudinally or laterally.

Step 3: If the safety model functional module of ego vehicle works effectively, the ego vehicle will stop approaching the target vehicle when the longitudinal distance or lateral distance is close to the minimum safe distance. Finally, the velocity of ego vehicle is equal to the target vehicle's velocity, and the distance stays unchanged (distance≥minimum safe distance).

2) Dynamic test. A dynamic test is designed to test the dynamic response capability of ego vehicle after it reaches the relatively steady state against the target vehicle. In a dynamic test, the ego-vehicle is expected to response to the action of target vehicle (braking or lateral movement), and maintain the longitudinal/lateral safe distance. The test flow for a dynamic test is described as follows:

Step 1: The ego vehicle and target vehicle together with other actors start driving at some initial conditions (initial location, initial velocity and initial acceleration) along a given route.

Step 2: The target vehicle keeps driving along the route at constant velocity, and the ego vehicle approaches the target vehicle either longitudinally or laterally. Finally, the ego vehicle reaches the relatively steady state against the target vehicle, in which the velocity of ego vehicle is equal to the target vehicle's velocity, and the distance stays unchanged (distance≥minimum safe distance).

Step 3: The target vehicle brakes longitudinally at a certain deceleration $a_{brake}$ ($a_{brake} < a_{max,brake}$), or laterally moves to ego vehicle at a certain acceleration $a_{2,accel}^{lat}$ ($a_{2,accel}^{lat} < a_{2,max,accel}^{lat}$) during the response time $\rho_2$ and then immediately brakes by at least the minimum reasonable braking force $a_{2,min,brake}^{lat}$. The ego vehicle should take (cause or implement) a proper response to maintain the safe distance.

3) Stress test. The stress test is used to test the ego vehicle's ultimate response capability in a worst case. The test flow for a stress test is described as follows:

Step 1: The ego vehicle and target vehicle together with other actors start driving at some initial conditions (initial location, initial velocity and initial acceleration) along a given route.

Step 2: The ego vehicle approaches the target vehicle longitudinally at maximum acceleration $a_{max,accel}$, or approaches the target vehicle laterally at maximum acceleration $a_{1,max,accel}^{lat}$.

Step 3: When the distance between ego vehicle and target vehicle reduces to the minimal safe distance which is calculated using the real time safety model parameters, the target vehicle starts braking longitudinally at maximum deceleration $a_{max,brake}$, or laterally moves to ego vehicle at maximum acceleration $a_{2,max,accel}^{lat}$ during the response time $\rho_2$ and then immediately brakes by at least the minimum reasonable braking force $a_{2,min,brake}^{lat}$.

The ego vehicle is expected to take (cause or implement) a proper response to maintain the safe distance.

g) Safety model-specific RTK checker 370. This module is used to measure the real-time kinematics (RTK) of a virtual vehicle during the test (e.g., a steady state test, dynamic test, and stress test), and then check if it complies with the values in a safety model parameters table.

In an example, the RTK parameters include:

i) $v_r$, which means the longitudinal velocity of ego-vehicle at moment t ii) $a_{accel}$, which means the longitudinal acceleration of ego-vehicle at moment t. With f being the frame rate of simulation, $a_{accel}$ can be calculated by:

$$a_{accel} = \Delta v_r \cdot f$$

iii) $a_{brake}$, which means the deceleration of ego-vehicle at moment t. With f being the frame rate of simulation, this value can be calculated by:

$$a_{brake} = -\Delta v_t \cdot f$$

iv) $v_1^{lat}$, which means the lateral velocity of ego-vehicle at moment t.

v) $a_{1,accel}^{lat}$, which means the lateral acceleration of ego-vehicle at moment t. With f being the frame rate of simulation, this value can be calculated by:

$$a_{1,accel}^{lat} = \Delta v_1^{lat} \cdot f$$

vi) $a_{1,brake}^{lat}$, which means the lateral deceleration of ego-vehicle at moment t. With f being the frame rate of simulation, this value can be calculated by:

$$a_{1,brake}^{lat} = -\Delta v_1^{lat} \cdot f$$

vii) $\rho_{measured}$, which means the measured response time of ego-vehicle. $\rho_{measured}$ can be calculated by:

$$\rho_{measured} = T_{action} - T_{violation}$$

In this example, $T_{violation}$ is the moment that the minimum longitudinal or lateral safe distance is violated, and $T_{action}$ is the moment that the ego-vehicle takes action to recover the safe distance, e.g., braking.

The measured RTK parameters must comply with the preset safety model parameters table written by test agent, according to the following principles:

1) $a_{accel} \leq a_{max,accel}$
2) $a_{brake} \geq a_{min,brake}$
3) $a_{1,accel}^{lat} \leq a_{1,max,accel}^{lat}$
4) $a_{1,brake}^{lat} \geq a_{1,min,brake}^{lat}$ 5) $|\rho_{measured} - \rho| \leq \dfrac{N}{f}$.

N is recommended to be 1 or 2. f is the frame rate of simulation.

In an example, the safety model-specific RTK checker 370 detects any violation of the five principles and reports the violation.

h) Safety model-based rating 390. There are existing performance indicators widely used for ADS overall performance rating, e.g., safety, comfort, natural driving, and ecology. However, the present simulation testbed focuses on a safety model functionality test, so the following specific performance indicators for safety model functionality may be calculated.

1) Quick response capability $S_{qrc}$. The response time of ego vehicle is the time delay from the moment the violation of minimum safe distance occurs to the moment ego vehicle takes action to recover the safe distance. The smaller response time means better safety model functionality and improved safety, and thus it can be a performance indicator of safety model functional module. This may be measured by:

$$S_{qrc} = \dfrac{\rho_{ref}}{\rho_{measured}}$$

$\rho_{ref}$ is the reference response time, which may be defined as 200 ms in a safety model standard. $\rho_{measured}$ is the actual measured response time.

2) Safety model parameters violation $S_{rpv}$. This criterion indicates if the RTK of virtual vehicle complies with the declared safety model parameters. In the testbed 300, the module of safety model-specific RTK checker 370 can provide the check result of safety model parameters violation. $S_{rpv}$ is equal to the number of the violated safety model parameters.

3) Safety model functional effectiveness $S_{rfe}$. This criterion indicates if ego-vehicle can detect the violation of minimum safe distance and then take action to avoid a collision successfully under given simulation working condition.

$$S_{rfe} = \sum_{n=1}^{N} R_n;$$

$$R_n = \begin{cases} 1 \text{(if test case } n \text{ passes)} \\ 0 \text{(if test case } n \text{ fails)} \end{cases}$$

$R_n$ is the test result of safety model test case n, and it should be 0 or 1. N is the total number of executed safety model tests.

4) Safety model functional usability $S_{rfu}$. A safety model functional module tends to use a larger following distance to avoid potential risk of collision, and reduce sharp acceleration, sudden braking, and frequently switching between acceleration and braking, which will make passengers uncomfortable. However, the larger following distance also reduces the usability of safety model functionality in a real traffic environment. This criterion is proposed to evaluate safety model functional usability, which can be quantized by:

$$S_{rfu} = \int_0^T |d_t - d_{safe,t}| dt$$

T is the simulation period; $d_t$ is the actual distance at moment t; $d_{safe,t}$ is the minimum safe distance at moment t.

Accordingly, the safety model-based rating 390 is used to assess the performance of a safety model functional module (e.g., provided by a vehicle manufacturer or vehicle service provider) according to above performance indicators.

Figure 4:
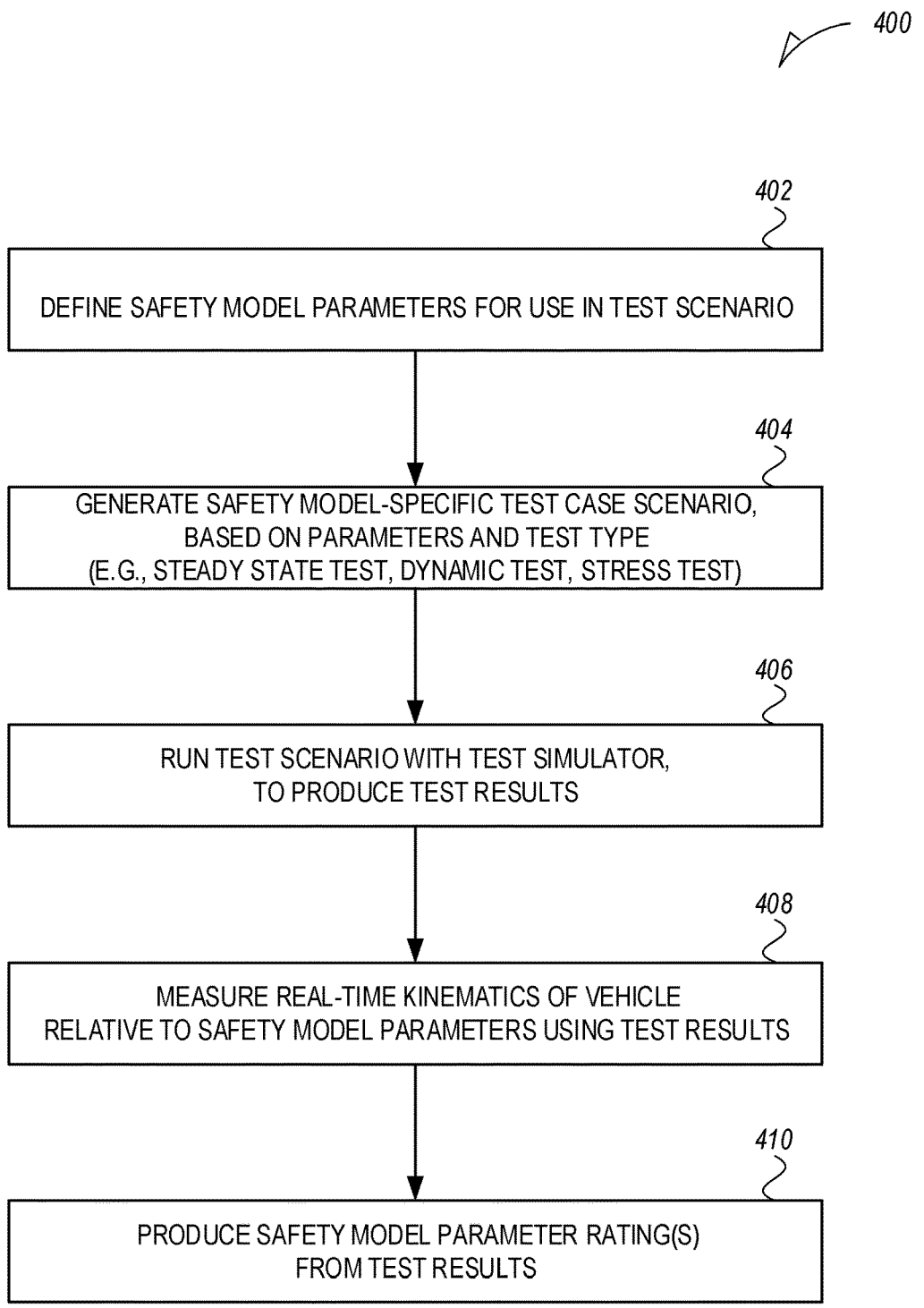
FIG. 4 illustrates an example of a process flow for configuration and use of a test system, with application of vehicle safety operational model parameters, according to an embodiment.

FIG. 4 depicts a flowchart 400 of a method for configuration and use of a test system, for application of vehicle safety operational model parameters, according to the present techniques. As discussed herein, this method may be used for verifying or measuring compliance of some safety system (e.g., vehicle control system software) with a VOSM, in a test setting. In the following flowchart, specific reference to RSS concepts is provided, but concepts from other VOSMs may also be tested and applied.

Operation 402 includes defining safety model parameters (e.g., RSS parameters or other safety condition parameters) for use in the test scenario, as the test scenario is configured to test performance of the relevant safety system. This operation may be performed with use of the safety model parameters table 320, as discussed above.

Operation 404 includes generating a safety model-specific test case scenario, based on the safety model parameters and a test type to attempt (e.g., steady state test, dynamic test, stress test). This may be performed with the test case generation module 330, as discussed above.

Operation 406 involves executing the test scenario with a test simulator, to produce test results for the safety system. This may be performed with the scenario engine 340 and simulator 350, as discussed above.

Operation 408 involves measuring real-time kinematics of the safety system, during execution of the test scenario, based on compliance with the safety model parameters. This may be performed with the safety model-specific RTK checker 370, as discussed above.

Operation 410 involves producing one or more parameter ratings for performance of the safety system with a safety model (or the other VOSM being tested), based on the test results and the measured real-time kinematics. This may be performed with use of the logging 380 and the safety model-based rating 390, as discussed above.

In further examples, a simulation test of AV decision making for safety operations and models implementing such operations may be based on the following testing scenarios, parameters, and test use cases. Such approaches are based on those discussed by China ITS standard "Test Procedures and Evaluation Rules for Safety Assurance of AV Decision Making" (T/ITS 0116-2019).

First, a range and format of parameters may be defined using expressions for simulation tests of an autonomous driving scenario. For example, the range of pedestrian's speed V in a scenario which is 1.0 km/h-12.0 km/h, with the step size of 2.0 km/h, can be described by the expression of V=[1.0:12.0:2.0] km/h. In a similar example, if the parameter V can be assigned to any value within the range, it will be described by the expression of V=[1.0:12.0] km/h. Likewise, if the parameter is non-uniform distribution, for example, the pedestrian's speed V in the scenario is assigned to one of the 1.0 km/h, 5.0 km/h and 12.0 km/h, then it will be described by the expression of V={1.0, 5.0, 12.0} km/h.

Next, a longitudinal driving scenario test may be defined according to the following approaches. A longitudinal driving scenario test may involve setting input parameters and testing parameters for the scenario (e.g., a setting of an initial distance in a car-following scenario); followed by defining a specific test case (e.g., a car-following scenario on a straight line, such as discussed below with reference to FIG. 6A; a car-following scenario on a curved lane, such as discussed below with reference to FIG. 6B; or a cut-in scenario, such as discussed below with reference to FIG. 6C); and finally, performance of the longitudinal driving scenario.

The operations to set an initial distance in a longitudinal, car-following scenario may be performed as follows. At the beginning of the test, an initial distance may be set between two vehicles, which should be greater than a minimum safe longitudinal distance. The front vehicle then brakes during the test, and braking time is preset by the tester according to a test field condition. The rear vehicle always monitors the distance between the two vehicles while it is approaching the front one, and takes a proper response (e.g., causes braking to be applied) when it reaches the minimum safe longitudinal distance. Therefore, the setting of the initial distance needs to ensure that the front vehicle performs braking when the rear vehicle enters the dangerous situation, so as to fully evaluate the scenario described in the formula of the minimum safe distance. If the initial distance is set too small, the rear vehicle will enter the longitudinal dangerous situation before the front vehicle starts braking; if the initial distance is set too large, the rear vehicle will not enter the dangerous situation even if the front vehicle has finished braking.

Figure 5A:
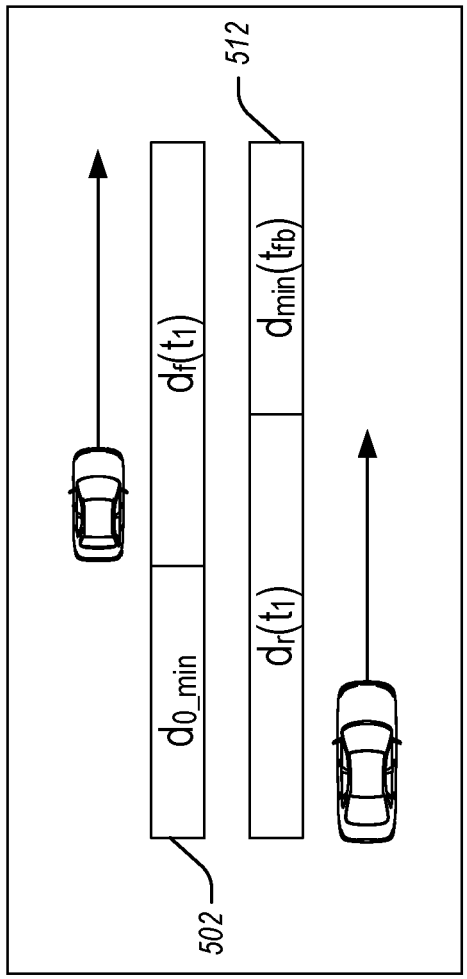
FIGS. 5A-5B illustrate a procedure for initial distance setting used in scenario testing for a vehicle safety operational model, according to an embodiment.
Figure 5B:
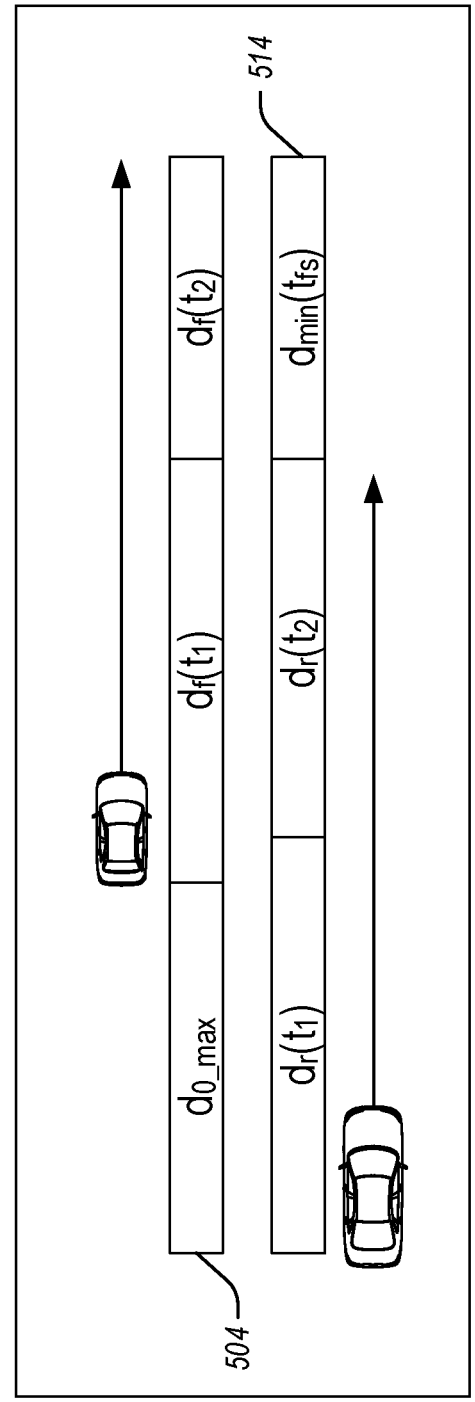

A procedure for initial distance setting is illustrated in FIGS. 5A and 5B. Suppose that $t_1$ is the time duration from the initial moment $t_0$ to the moment $t_{fb}$ when the front vehicle starts braking, and $t_2$ is the time duration from $t_{fb}$ to the moment $t_{fs}$ when the front vehicle stops. The minimum initial distance $d_0\_min$ 502 is defined to meet the requirement that the distance between the two vehicles equals the minimum safe longitudinal distance $d_{min}(t_{fb})$ 512 when the front vehicle starts braking; the maximum initial distance $d_0\_max$ 504 is defined to meet a requirement that the distance between the two vehicles equals the minimum safe longitudinal distance $d_{min}(t_{fs})$ 514 when the front vehicle has finished braking.

As will be understood, the formula is dependent on the vehicle's state during the test. Thus, the formula will be adapted according to one of the following test cases.

Figure 6A:
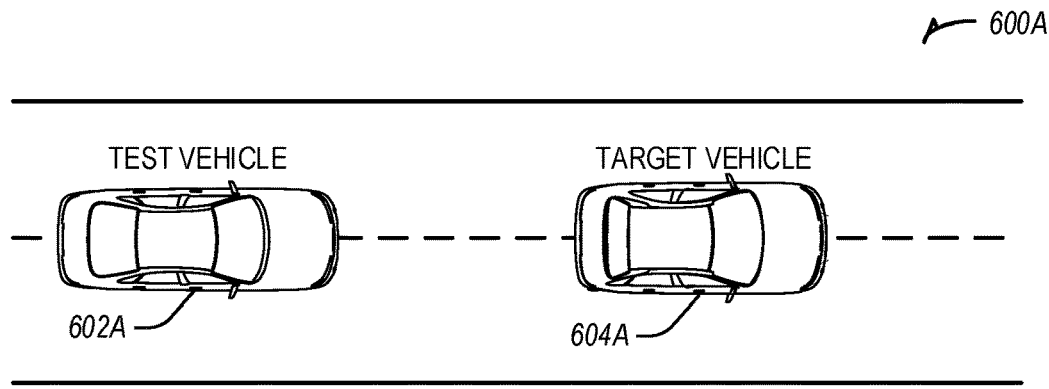
FIGS. 6A-6C illustrate respective test cases used in scenario testing for a vehicle safety operational model, according to an embodiment.

Car-following on Straight Lane Test Case—Constant Speed and Maximum Deceleration. FIG. 6A illustrates a diagram 600A of a straight lane car-following test scenario, where a test vehicle 602A follows a target vehicle 604A. In a first test scenario, both vehicles 602A, 604A are driving at a constant speed, and then the front vehicle brakes at the maximum braking deceleration.

The test purpose (of the first scenario, occurring at the constant speed) is to check or verify whether the rear vehicle can take (cause or implement) a proper response to avoid the collision, when the front vehicle brakes with the reasonable braking deceleration. In an example, the test environment may have the following characteristics: daytime, sunny, asphalt pavement, dry road condition, straight lane, clear lane mark.

In an example, the test procedures for the straight-lane test started at constant speed may include the following:

1) At time $t_0$, the test vehicle (the rear vehicle) and the target vehicle (the front, leading vehicle) are driving at a constant speed along the lane center, and the speed of the rear vehicle is greater than the front one. The initial distance is set within the range of $[d_0\_min:d_0\_max]$.

2) At time $t_{fb}$, the front vehicle brakes with the deceleration $a_{max,brake}^{long}$ (Note: $t_{fb}$ is preset by the tester).

3) At time $t_s$, both the test vehicle and the target vehicle stop.

In an example, the input parameters for the straight-lane test started at constant speed may include the following:

1) The response time ρ p of the test vehicle;
2) The maximum acceleration $a_{max,accel}^{long}$ of the test vehicle;
3) The minimum braking deceleration $a_{min,brake}^{long}$ of the test vehicle;
4) The maximum velocity $v_{max}$ of the test vehicle;
5) The safe distance margin ε.

In an example, the testing parameters for the straight-lane test started at constant speed started at the constant speed may include the following:

1) $v_r(t_0)=\{v_{max}*20\%, v_{max}*50\%, v_{max}*80\%, v_{max}\}$km/h, $v_f(t_0)=v_r(t_0)-5$ km/h;

2) $a_{max,brake}^{long}=6.1$ m/s²

3) The braking moment of the front vehicle $t_{fb}$, which is determined by the tester.

4) The $d_0\_min$ is calculated as: $d_0\_min+d_f(t_1)=d_r(t_1)+d_{min}(t_{fb})$, where: $d_f(t_1)$ is the driving distance of the front vehicle from the initial moment to the moment when it starts braking; $d_r(t_1)$ is the driving distance of the rear vehicle from the initial moment to the moment when the front vehicle starts braking; $d_{min}(t_{fb})$ is the minimum safe longitudinal distance corresponding to the moment when the front vehicle starts braking; where $$d_{min}(t_{fb}) = \left[ v_r(t_{fb})*\rho + \frac{a_{max,accel}^{long}\rho^2}{2} + \frac{(v_r(t_{fb})+\rho a_{max,accel}^{long})^2}{2d_{min,brake}^{long}} - \frac{v_f^2(t_{fb})}{2d_{max,brake,ref}^{long}} \right]_+ + \varepsilon$$

Where $v_f(t_{fb})$ is the velocity of the front vehicle at the moment when it starts braking; and $v_r(t_{fb})$ is the velocity of the rear vehicle at the moment when the front vehicle starts braking.

Because both vehicles are uniform motion before $t_{fb}$, there is $$d_{min}(t_{fb}) = d_{min}(t_0) = \left[v_r(t_0)*\rho + \frac{a_{max,accel}^{long}\rho^2}{2} + \frac{(v_r(t_0)+\rho a_{max,accel}^{long})^2}{2d_{min,brake}^{long}} - \frac{v_f^2(t_0)}{2d_{max,brake,ref}^{long}}\right]_+ + \varepsilon$$

Where $v_f(t_0)$ is the velocity of the front vehicle at the initial moment; $v_r(t_0)$ is the velocity of the rear vehicle at the initial moment. Therefore, $$d_{0\_min} = t_1*(v_r(t_0)-v_f(t_0))+d_{min}(t_0)$$

Where $d_{min}(t_0)$ is the minimum safe longitudinal distance at the initial moment.

5) The $d_{0\_max}$ is calculated as:

$$d_{0\_max}+d_f(t_1)+d_f(t_2)=d_r(t_1)+d_r(t_2)+d_{min}(t_{fs})$$

where $d_f(t_2)$ is the driving distance of the front vehicle from the moment when it starts braking to the moment when it stops; $d_r(t_2)$ is the driving distance of the rear vehicle from the moment when the front vehicle starts braking to the moment when the front vehicle stops; $d_{min}(t_{fs})$ is the minimum safe longitudinal distance at the moment when the front vehicle stops.

Because the front vehicle is moving at a constant deceleration during $t_2$, and the rear vehicle is moving at a constant velocity, there is:

$$t_2 = \frac{v_f(t_0)}{a_{max,brake,ref}^{long}}$$

$$d_f(t_2) = \frac{v_f^2(t_0)}{a_{max,brake,ref}^{long}}$$

$$d_r(t_2) = v_r(t_0)*\frac{v_f(t_0)}{a_{max,brake,ref}^{long}}$$

$$d_{min}(t_{fs}) = \left[v_r(t_0)*\rho + \frac{a_{max,accel,ref}^{long}\rho^2}{2} + \frac{(v_r(t_0)+\rho a_{max,accel}^{long})^2}{2d_{min,brake}^{long}}\right]_+ + \varepsilon$$

Therefore, $$d_{0\_max} = t_1*(v_r(t_0)-v_f(t_0))+v_r(t_0)*\frac{v_f(t_0)}{a_{max,brake,ref}^{long}}+d_{min}(t_0)$$

In an example, the logging parameters for the straight-lane test started at constant speed may include the following:

1) The distance d(t) between the two vehicles during the duration $[t_{fb}:t_s]$;
2) The danger threshold time $t_b$;
3) The actual response time $\rho_{real}$ of the test vehicle;
4) The maximum acceleration of the test vehicle during the response time $a_{real,max,accel}^{long}$;
5) The minimum braking deceleration of the test vehicle after the response time $a_{real,min,brake}^{long}$.

In an example, the test passing criteria for the straight-lane test started at constant speed may include the following: (e.g., criteria that must be met simultaneously):

1) $d(t) \geq \varepsilon, t \in [t_{fb}:t_s]$
2) $\rho_{real} \leq \rho$
3) $a_{real,max,accel}^{long} \leq a_{max,accel}^{long}$
4) $a_{min,brake}^{long} \leq a_{real,min,brake}^{long} \leq a_{max,brake}^{long}$ Car-following on Straight Lane Test Case—Maximum Acceleration and Maximum Deceleration. As noted above, FIG. 6A illustrates a diagram 600A of the straight lane car-following test scenario, where a test vehicle 602A follows a target vehicle 604A. In a second test scenario, the rear vehicle 602A accelerates at maximum acceleration, and then the front vehicle 604A brakes at the maximum braking deceleration.

The test purpose (of the second straight lane scenario, occurring at the maximum acceleration/braking deceleration speeds) is to check or verify whether the rear vehicle can take (cause or implement) a proper response to avoid the collision during acceleration, when the front vehicle brakes with the reasonable braking deceleration. In an example, the test environment may have the following characteristics: daytime, sunny, asphalt pavement, dry road condition, straight lane, clear lane mark.

In an example, the test procedures for the straight-lane test started at maximum acceleration may include the following:

1) The test vehicle (rear vehicle) and the target vehicle (front vehicle) are driving along the centerline of the lane at the same initial velocity, and the range of the initial distance is set within the range of $[d_{0\_min}:d_{0\_max}]$.
2) At time $t_0$, the test vehicle begins accelerating with $a_{max,accel}^{long}$, while the front vehicle is driving at a constant velocity.
3) At time $t_{fb}$, the front vehicle brakes with the deceleration of $a_{max,brake}^{long}$. (Note: $t_{fb}$ is preset by the tester).
4) At time $t_s$, both the test vehicle and the target vehicle stop.

In an example, the input parameters for the straight-lane test started at maximum acceleration may include the following:

1) The response time $\rho$ of the test vehicle;
2) The maximum acceleration $a_{max,accel}^{long}$ of the test vehicle;
3) The minimum braking deceleration $a_{min,brake}^{long}$ of the test vehicle;
4) The maximum velocity $v_{max}$ of the test vehicle;
5) The safe distance margin $\varepsilon$.

In an example, the testing parameters for the straight-lane test started at maximum acceleration may include the following:

1) $v_r(t_0)=v_f(t_0)=\{v_{max}*20\%, v_{max}*50\%, v_{max}*80\%, v_{max}\}$ km/h
2) $a_{max,brake}^{long}=6.1$ m/s$^2$
3) The braking moment of the front vehicle $t_{fb}$, which is determined by the tester.
4) The $d_{0\_min}$ is calculated as:

$$d_{0\_min}+d_f(t_1)=d_r(t_1)+d_{min}(t_{fb}) \Rightarrow d_{0\_min} = t_1*(v_r(t_0)-v_f(t_0))+\frac{1}{2}a_{max,accel}^{long}*t_1^2+d_{min}(t_{fb})$$ where, $$d_{min}(t_{fb}) = \left[v_r(t_{fb})*\rho + \frac{a_{max,accel}^{long}\rho^2}{2} + \frac{(v_r(t_{fb})+\rho a_{max,accel}^{long})^2}{2d_{min,brake}^{long}} - \frac{v_f^2(t_{fb})}{2d_{max,brake,ref}^{long}}\right]_+ + \varepsilon$$

-continued $$v_r(t_{fb}) = v_r(t_0) + a_{max,accel,ref}^{long} * t_1$$

$$v_f = (t_{fb}) = v_f(t_0)$$

5) The $d_{0\_max}$ is calculated as:

$$d_{0\_max} + d_f(t_1) + d_f(t_2) =$$

$$d_r(t_1) + d_r(t_2) + d_{min}(t_{fs}) \Rightarrow d_{0max} = \frac{1}{2} a_{max,accel}^{long} * t_1^2 +$$

$$v_r(t_{fb}) * t_2 + \frac{1}{2} a_{max,accel}^{long} * t_2^2 - \frac{v_f^2(t_0)}{2a_{max,brake,ref}^{long}} + d_{min}(t_{fs}) \text{ where,}$$

$$t_2 = \frac{v_f(t_0)}{a_{max,brake,ref}^{long}}$$

$$v_r(t_{fb}) = v_r(t_0) + a_{max,accel}^{long} * t_1$$

$$v_r(t_{fs}) = v_r(t_0) + a_{max,accel}^{long} * (t_1 + t_2)$$

$$d_{min}(t_{fs}) = \left[ v_r(t_{fs}) * \rho + \frac{a_{max,accel}^{long} \rho^2}{2} + \frac{(v_r(t_{fs}) + \rho a_{max,accel}^{long})^2}{2a_{min,brake,ref}^{long}} \right]_+ + \varepsilon$$

In an example, the logging parameters for the straight-lane test started at maximum acceleration may include the following:

1) The distance d (t) between the two vehicles during the duration [$t_{fb}$:$t_s$];
2) The danger threshold time $t_b$;
3) The actual response time $\rho_{real}$ of the test vehicle;
4) The maximum acceleration of the test vehicle during the response time $a_{real,max,accel}^{long}$;
5) The minimum braking deceleration of the test vehicle after the response time $a_{real,min,brake}^{long}$.

Figure 6B:
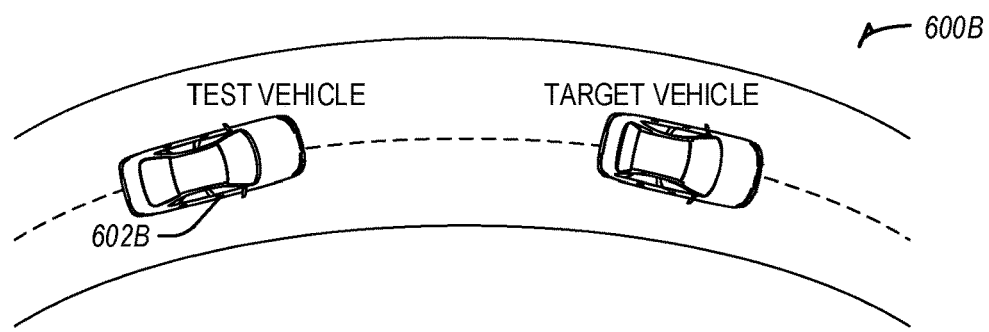

In an example, the test passing criteria for the straight-lane test started at maximum acceleration may include the following: (e.g., criteria that must be met simultaneously):

1) $d(t) \geq \varepsilon, t \in [t_{fb}:t_s]$
2) $\rho_{real} \leq \rho$
3) $a_{real,max,accel}^{long} \leq a_{max,accel}^{long}$
4) $a_{min,brake}^{long} \leq a_{real,min,brake}^{long} \leq a_{max,brake}^{long}$ Car-following on Curved Lane Test Case—Constant Speed and Maximum Deceleration. FIG. 6B illustrates a diagram 600B of a curved lane car-following test scenario, where a test vehicle 602B follows a target vehicle 604B. In a first test scenario (similar to that discussed above), both vehicles 602B, 604B are driving at a constant speed, and then the front vehicle brakes at the maximum braking deceleration.

The test purpose of the curved lane scenario is to check or verify whether the rear vehicle can take (cause or implement) a proper response to avoid the collision, when the front vehicle brakes with the reasonable braking deceleration. In an example, the test environment may have the following characteristics: daytime, sunny, asphalt pavement, dry road condition, curved lane (curvature of the road=[0.002,0.005]), clear lane mark.

In an example, the test procedures for the curved-lane test at constant speed may include the following:

1) At time $t_0$, the test vehicle (rear one) and the target vehicle (front one) are driving at a constant speed along the lane center (as shown in FIG. 6B), and the speed of the rear vehicle is greater than the front one. The initial distance is set within the range of [$d_0$_min:$d_0$_max]. Since the lane coordinate system is adopted, the initial distance calculation method is the same as that of the straight lane car-following scenario.

2) At time $t_{fp}$, the front vehicle brakes with the deceleration $a_{max,brake}^{long}$ (Note: $t_{fp}$ is preset by the tester).
3) At time $t_s$, both the test vehicle and the target vehicle stop.

In an example, the input parameters for the curved-lane test may include the following:

1) The response time $\rho$ of the test vehicle;
2) The maximum acceleration $a_{max,accel}^{long}$ of the test vehicle;
3) The minimum braking deceleration $a_{min,brake}^{long}$ of the test vehicle;
4) The maximum velocity $v_{max}$ of the test vehicle;
5) The safe distance margin $\varepsilon$.

In an example, the testing parameters for the curved-lane test may include the following:

1) $v_r(t_0) = \{v_{max}*20\%, v_{max}*50\%, v_{max}*80\%, v_{max}\}$ km/h, $v_f(t_0) = v_r(t_0) - 5$ km/h;
2) $a_{max,brake}^{long} = 6.1$ m/s²
3) The braking moment of the front vehicle $t_{fp}$, which is determined by the tester.

$$d_{0\_min} = t_1 * (v_r(t_0) - v_f(t_0)) + d_{min}(t_0) \quad 4)$$

$$d_{0\_max} = t_1 * (v_r(t_0) - v_f(t_0)) + v_r(t_0) * \frac{v_f(t_0)}{a_{max,brake,ref}^{long}} + d_{min}(t_0) \quad 5)$$

In an example, the logging parameters for the curved-lane test may include the following:

1) The distance d(t) between the two vehicles during the duration [$t_{fb}$:$t_s$];
2) The danger threshold time $t_b$;
3) The actual response time $\rho_{real}$ of the test vehicle;
4) The maximum acceleration of the test vehicle during the response time $a_{real,max,accel}^{long}$;
5) The minimum braking deceleration of the test vehicle after the response time $a_{real,min,brake}^{long}$.

In an example, the test passing criteria for the straight-lane test may include the following: (e.g., criteria that must be met simultaneously):

1) $d(t) \geq \varepsilon, t \in [t_{fb}:t_s]$
2) $\rho_{real} \leq \rho$
3) $a_{real,max,accel}^{long} \leq a_{max,accel}^{long}$
4) $a_{min,brake}^{long} \leq a_{real,min,brake}^{long} \leq a_{max,brake}^{long}$ Car-following on Curved Lane Test Case—Maximum Acceleration and Maximum Deceleration. As noted above, FIG. 6B illustrates a diagram 600B of the curbed lane car-following test scenario, where a test vehicle 602B follows a target vehicle 604B. In a second test scenario, the rear vehicle 602B accelerates at maximum acceleration, and then the front vehicle 604B brakes at the maximum braking deceleration.

The test purpose (of the second curved lane scenario, occurring at the maximum acceleration/braking deceleration speeds) is to check or verify whether the rear vehicle can take (cause or implement) a proper response to avoid the collision during acceleration, when the front vehicle brakes with the reasonable braking deceleration. In an example, the test environment may have the following characteristics: daytime, sunny, asphalt pavement, dry road condition, curved road (curvature of the road=[0.002,0.005]), clear lane mark.

In an example, the test procedures for the curved-lane test started at maximum acceleration may include the following:

1) The test vehicle (rear vehicle) and the target vehicle (front vehicle) are driving along the centerline of the lane at the same initial velocity, and the range of the initial distance is set within the range of $[d_{0\_min}:d_{0\_max}]$.

2) At time $t_0$, the test vehicle begins accelerating with $a_{max,accel}^{long}$, while the target vehicle is driving at a constant velocity.

3) At time $t_{fb}$, the front vehicle brakes with the deceleration of $a_{max,brake}^{long}$. (Note: $t_{fb}$ is preset by the tester).

4) At time $t_s$, both the test vehicle and the target vehicle stop.

In an example, the input parameters for the curved-lane test may include the following:

1) The response time $\rho$ of the test vehicle;
2) The maximum acceleration $a_{max,accel}^{long}$ of the test vehicle;
3) The minimum braking deceleration $a_{min,brake}^{long}$ of the test vehicle;
4) The maximum velocity $v_{max}$ of the test vehicle;
5) The safe distance margin $\varepsilon$.

In an example, the testing parameters for the curved-lane test started at maximum acceleration may include the following:

1) $v_r(t_0) = v_f(t_0) = \{v_{max}*20\%, v_{max}*50\%, v_{max}*80\%, v_{max}\}$ km/h
2) $a_{max,brake}^{long} = 6.1$ m/s$^2$
3) The braking moment of the front vehicle $t_{fb}$, which is determined by the tester.

$$d_{0\_min} = t_1 * (v_r(t_0) - v_f(t_0)) + \frac{1}{2} a_{max,accel}^{long} * t_1^2 + d_{min}(t_{fb}) \quad 4)$$

$$d_{0\_max} = \frac{1}{2} a_{max,accel}^{long} * t_1^2 + v_r(t_{fb}) * t_2 + \frac{1}{2} a_{max,accel}^{long} * t_2^2 - \frac{v_f^2(t_0)}{2 a_{max,brake,ref}^{long}} + d_{min}(t_{fs}) \quad 5)$$

In an example, the logging parameters for the curved-lane test started at maximum acceleration may include the following:

1) The distance $d(t)$ between the two vehicles during the duration $[t_{fb}:t_s]$;
2) The danger threshold time $t_b$;
3) The actual response time $\rho_{real}$ of the test vehicle;
4) The maximum acceleration of the test vehicle during the response time $a_{real,max,accel}^{long}$;
5) The minimum braking deceleration of the test vehicle after the response time $a_{real,min,brake}^{long}$.

Figure 6C:
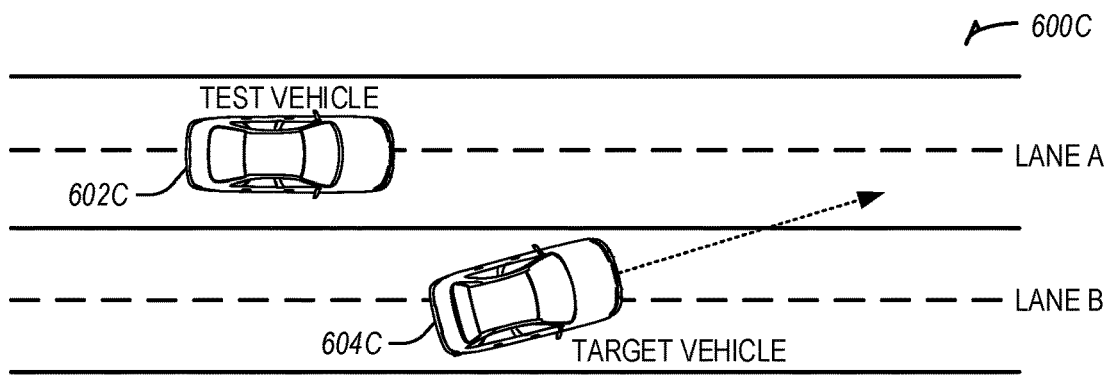

In an example, the test passing criteria for the curved-lane test may include the following: (e.g., criteria that must be met simultaneously):

1) $d(t) \geq \varepsilon, t \in [t_{fb}:t_s]$
2) $\rho_{real} \leq \rho$
3) $a_{real,max,accel}^{long} \leq a_{max,accel}^{long}$
4) $a_{min,brake}^{long} \leq a_{real,min,brake}^{long} \leq a_{max,brake}^{long}$ Car Cut-in Test Case. FIG. 6C illustrates a diagram 600C of a car cut-in test scenario, where a test vehicle 602C, which is following a path in Lane A, encounters a cut-in maneuver from a target vehicle 604C. The test purpose is to check or verify whether the test vehicle can take (cause or implement) a proper response to avoid the collision when the target vehicle suddenly cuts into its lane. In an example, the test environment may have the following characteristics: Daytime, sunny, asphalt road, dry road condition, straight lane, two-lane roads, clear lane marks.

In an example, the test procedures for the cut-in test may include the following:

1) The test vehicle $C_1$ and the neighboring vehicle $C_2$ in the target lane drive side by side at the same constant velocity along the center line of the lane;

2) The neighboring vehicle $C_2$ suddenly accelerates and quickly merges into the lane of the test vehicle $C_1$, and the distance between the two vehicles at that moment is less than the minimum safe longitudinal distance.

In an example, the input parameters for the cut-in test case may include:

1) The response time $\rho$ of the test vehicle;
2) The maximum acceleration $a_{max,accel}^{long}$ of the test vehicle;
3) The minimum braking deceleration $a_{min,brake}^{long}$ of the test vehicle;
4) The maximum velocity $v_{max}$ of the test vehicle;
5) The safe distance margin $\varepsilon$.

In an example, the input parameters for the cut-in test may include the following:

1) $v_1(t_0) = v_2(t_0) = \{v_{max}*20\%, v_{max}*50\%, v_{max}*80\%, v_{max}\}$ km/h
2) $a_{2,accel}^{lateral} = 0.2$ m/s$^2$
3) $a_{2,accel}^{long}$ is defined as below:

Consider a scenario where the target vehicle $C_2$ requires time $t_c$ to move from its lane to the other lane by accelerating laterally. This can be expressed as:

$$t_c = \sqrt{\frac{w_{lane1} + w_{lane2}}{a_{2,accel}^{lateral}}}$$

Where $w_{lane1}$, $w_{lane2}$ is the width of the lane. During this period, the target vehicle $C_2$ overtakes the test vehicle $C_1$ with the acceleration of $a_{2,accel}^{long}$. If the distance between two vehicles at time $t_c$ is less than or equal to the minimum longitudinal safety distance of $C_1$, the test vehicle will enter the dangerous situation and then the proper response will be triggered. Then the maximum value of $a_{2,accel}^{long}$ should meet as follows:

$$v_2(t_0)*t_c + \frac{1}{2} a_{2,accel}^{long} * t_c^2 =$$

$$v_1(t_0)*t_c + d_{min}(t_c) \Rightarrow \frac{t_c^2}{2 a_{max,brake,ref}^{long}} * a_{2,accel}^{long\ 2} + \left(\frac{t_c^2}{2} + \frac{v*t_c}{a_{max,brake,ref}^{long}}\right) *$$

$$a_{2,accel}^{long} + \frac{v^2}{2 a_{max,brake,ref}^{long}} - v\rho - \frac{a_{max,accel}^{long} * \rho^2}{2} - \frac{(v + \rho * a_{max,accel}^{long})^2}{2 a_{min,brake}^{long}} = 0$$

Therefore:

$$0 < a_{2,accel}^{long} \leq \frac{\sqrt{B^2 - 4AC} - B}{2A} \text{m/s}^2$$

Where:

$$A = \frac{t_c^2}{2 a_{max,brake,ref}^{long}} = \frac{w_{lane1} + w_{lane2}}{2 a_{2,accel}^{lateral} * a_{max,brake,ref}^{long}}$$

-continued $$B = \frac{t_c^2}{2} + \frac{v * t_c}{a_{max,brake,ref}^{long}} = \frac{w_{lane1} + w_{lane2}}{2a_{2,accel}^{lateral}} + \frac{v_1(t_0) * \sqrt{\frac{w_{lane1} + w_{lane2}}{a_{2,accel}^{lateral}}}}{a_{max,brake,ref}^{long}}$$

$$C = \frac{v_1(t_0)^2}{2a_{max,brake,ref}^{long}} - v_1(t_0)\rho - \frac{a_{max,accel}^{long} * \rho^2}{2} - \frac{(v_1(t_0) + \rho * a_{max,accel}^{long})^2}{2a_{min,brake}^{long}}$$

In an example, the test passing criteria for the cut-in test may be as follows: If the test vehicle is triggered to enter the dangerous situation and takes the proper response when the target vehicle cuts into its lane, the test case will be asserted as passed (e.g., this means that a collision is not used as the passing criteria).

Figure 7:
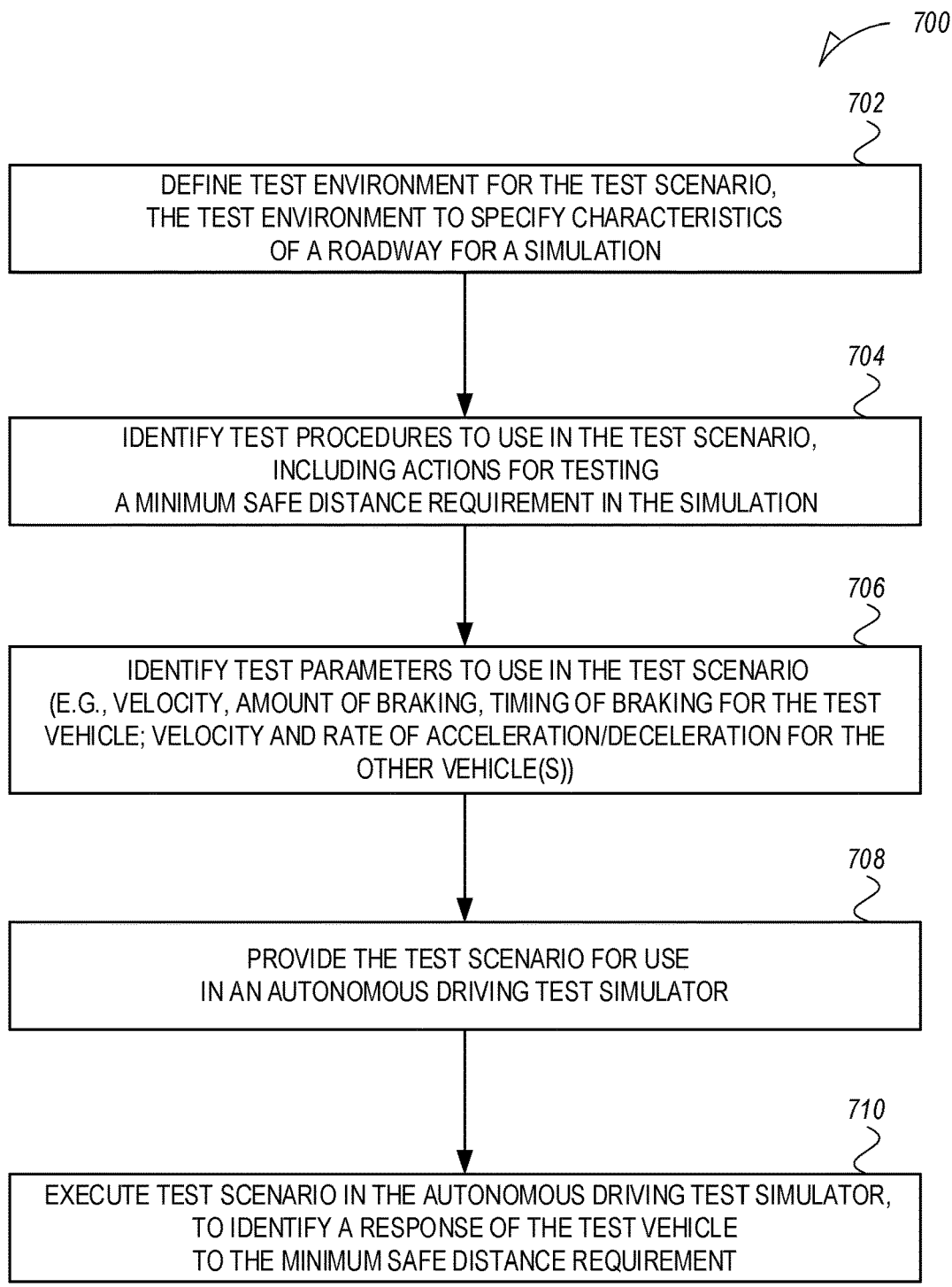
FIG. 7 illustrates an example flowchart of a method for measuring performance of a test scenario used in testing an autonomous driving safety requirement, according to an embodiment.

FIG. 7 illustrates a flowchart 700 of a method performed by a system or other configured component for autonomous vehicle test scenario evaluation. The operations of this method may be performed in a standalone computing system, a device integrated within or as part of a computing system, as part of a simulation engine or simulation processing system, or as part of instructions from a computing machine- or device-readable storage medium which are executed by circuitry of the computing machine, device, or platform. Such a machine, device, or platform may include memory and hardware (e.g., processing circuitry) as discussed with reference to FIG. 8, to store and process data for the test scenario.

At 702, operations are performed to define a test environment for the test scenario to be simulated. Such a test environment is used to specify characteristics of a roadway used (e.g., generated) in a simulation, such as whether the roadway or a roadway lane is straight or curved, the number of lanes, etc. Such characteristics may also include specifications relating to the test conditions in the environment, such as weather conditions (e.g., sunny, cloudy, etc.), the roadway conditions (e.g., asphalt road, dry or wet road conditions, clear lane marks), and variations thereof. In one example, the test scenario is defined to be a longitudinal car following scenario for a test vehicle following a target vehicle on a roadway, for a test where the target vehicle applies maximum braking deceleration. This longitudinal car following scenario may begin with the test vehicle and the target vehicle operating at a constant speed, or with the test vehicle applying a maximum acceleration value and the target vehicle operating at a constant speed, as discussed above. In another example, the test scenario is defined to be a cut-in scenario, where a target vehicle performs a lateral motion towards a trajectory of the test vehicle (e.g., cuts-in front of the target vehicle). With either of these examples, the test scenario may be used to test compliance of the test vehicle (and its accompanying planning and control operations) with at least one safety requirement such as a minimum safe distance requirement.

At 704, operations are performed to identify test procedures to use in the test scenario, including actions for testing a minimum safe distance requirement in the simulation. The minimum safe distance requirement relates to a distance between the test vehicle and at least one other vehicle (e.g., a target vehicle) present in the simulation. In this manner, the minimum safe distance requirement can be used to simulate and evaluate test outcomes involving one or both of a minimum lateral safety distance, or a minimum longitudinal safety distance, with one or more other actors.

At 706, operations are performed to identify test parameters to use in the test procedures of the test scenario (e.g., specific test parameters such as velocity, amount of braking, timing of braking for the test vehicle; velocity and rate of acceleration/deceleration for the other vehicle(s)). In a specific example, such test parameters may include input parameters provided by a tester or simulation/testing platform, such as values for: a response time of the test vehicle; a maximum acceleration value of the test vehicle; a minimum braking deceleration value of the test vehicle; a maximum velocity of the test vehicle; and a safe distance margin. In a longitudinal car following scenario example, such test parameters also may involve the setting of an initial distance between the test vehicle and the target vehicle, where the initial distance is equal to or greater than the minimum safe longitudinal distance. Consistent with the examples above, the initial distance may be set within a range between a minimum initial distance and a maximum initial distance, with the minimum initial distance being based on a requirement for the test scenario that a distance between the test vehicle and the target vehicle equals the minimum safe longitudinal distance when the test vehicle has started braking, and the maximum initial distance being based on a requirement for the test scenario that a distance between the test vehicle and the target vehicle equals the minimum safe longitudinal distance when the target vehicle has finished braking.

At 708, operations are performed to create, update, or otherwise provide the test scenario for use in an autonomous driving test simulator. This may be performed by providing a data output in memory (volatile or non-volatile storage) which creates or updates the test scenario, or updates data values associated with the test scenario. The test scenario may also be enabled for use in one or more simulations which are conducted by a test suite or set of test scripts used for autonomous driving verification.

At 710, operations are performed to evaluate or execute the test scenario (e.g., with evaluation in the autonomous driving test simulator, using the test procedures and test parameters). Such operations may identify the test scenario as compliant or non-compliant, and/or to identify or measure a response of the test vehicle to the minimum safe distance requirement. In an example, a test passing criteria for the longitudinal car following scenario includes meeting the following conditions simultaneously: i) a distance is maintained between the test vehicle and the target vehicle during a duration of the test scenario; ii) a response time of the test vehicle is equal to or smaller than a planned response time of the test vehicle; iii) a maximum acceleration value of the test vehicle is equal to or smaller than a planned maximum acceleration value of the test vehicle; and iv) a minimum braking value of the test vehicle during the response time is equal to or greater than a possible minimum braking value of the test vehicle, and the minimum braking value of the test vehicle after the response time is equal to or smaller than a maximum braking value of the test vehicle.

In a further example, operations are performed to define logging parameters for the test scenario, and/or to perform logging of such parameters during a simulation execution of the test scenario. In an example, logging parameters for the longitudinal car following scenario include values for: a distance between the test vehicle and the target vehicle during a duration of the longitudinal car following scenario; a danger threshold time;

a response time of the test vehicle; a maximum acceleration value of the test vehicle during the response time; and a minimum braking deceleration of the test vehicle after the response time. Also in a further example, the logging or execution results may be used to evaluate particular aspects of a vehicle operational safety model which provides a minimum safe distance requirement. For example, a vehicle under test (i.e., the test vehicle) may implement the vehicle operational safety model within planning and control functions of autonomous driving software. The execution of the test scenario in the autonomous driving test simulator, invoking the autonomous driving software, can be used to verify compliance of the planning and control functions with the minimum safe distance requirement and thus the vehicle operational safety model.

It will be understood that a variety of dangerous (or potentially dangerous) situations relating to safe distance or other safety criteria may be evaluated, consistent with the examples above. For instance, the dangerous situation may relate to a minimum safe distance requirement between the vehicle and a target vehicle, adjusted from test scenario parameters determined from among: longitudinal speed of the target vehicle; lateral speed of the target vehicle; longitudinal distance from the vehicle to the target vehicle; or lateral distance from the vehicle to the target vehicle. Other data values from a host vehicle's environment relating to the roadway, other vehicles, sensed objects or persons, etc., also may be evaluated and used for the test scenarios.

Finally, although flowchart 700 is described from the perspective of test scenario evaluation and test simulation systems, corresponding data processing operations to obtain, receive, analyze, and modify test scenario data and operate the simulation may be performed consistent with the present examples. Such operations may be performed in a stand-alone computing device, a system integrated within or as part of a data processing cloud, edge computing platform, or data center, as part of an automated data processing system, or as part of instructions from a computing machine- or device-readable storage medium which are executed by circuitry of the computing machine or device.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism or medium for storing information in a form readable by a machine (e.g., a computer). For example, a machine-readable storage device may include read-only memory (ROM), random-access memory (RAM), magnetic disk storage media, optical storage media, flash-memory devices, and other storage devices and media. A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, mechanisms, or units (collectively, "components"). Such components may be hardware, software, or firmware communicatively coupled to one or more processors in order to carry out the operations described herein. Components may be hardware components, and as such components may be considered tangible entities capable of performing specified operations and may be configured or arranged in a certain manner. In an example, circuits may be arranged (e.g., internally or with respect to external entities such as other circuits) in a specified manner as a component. In an example, the whole or part of one or more computer systems (e.g., a standalone, client or server computer system) or one or more hardware processors may be configured by firmware or software (e.g., instructions, an application portion, or an application) as a component that operates to perform specified operations. In an example, the software may reside on a machine-readable medium. In an example, the software, when executed by the underlying hardware of the component, causes the hardware to perform the specified operations. Accordingly, the term hardware component, module, mechanism, or unit is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which components are temporarily configured, each of the components need not be instantiated at any one moment in time. For example, where the components comprise a general-purpose hardware processor configured using software; the general-purpose hardware processor may be configured as respective different components at different times. Software may accordingly configure a hardware processor, for example, to constitute a particular component at one instance of time and to constitute a different component at a different instance of time. Components may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or components may, collectively or individually, be embodied as circuitry that forms part of a larger system, for example, an integrated circuit (IC), system on-chip (SoC), desktop computers, laptop computers, tablet computers, servers, smart phones, etc.

As used in any embodiment herein, the term "logic" may refer to firmware and/or circuitry configured to perform any of the aforementioned operations. Firmware may be embodied as code, instructions or instruction sets and/or data that are hard-coded (e.g., nonvolatile) in memory devices and/or circuitry. "Circuitry," as used in any embodiment herein, may comprise, for example, singly or in any combination, hardwired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor circuitry executing code and/or instructions sets (e.g., software, firmware, etc.) corresponding to the functionality described herein, thus configuring or transforming a general-purpose processor into a specific-purpose processing environment to perform one or more of the operations described herein. In some embodiments, the processor circuitry may be embodied as a stand-alone integrated circuit or may be incorporated as one of several components on an integrated circuit. In some embodiments, the various components and circuitry of the node or other systems may be combined in a system-on-a-chip (SoC) architecture. In other examples, the processing circuitry may be embodied or provided by a data processing unit (DPU), infrastructure processing unit (IPU), acceleration circuitry, or combinations of graphical processing units (GPUs) or programmed FPGAs.

Figure 8:
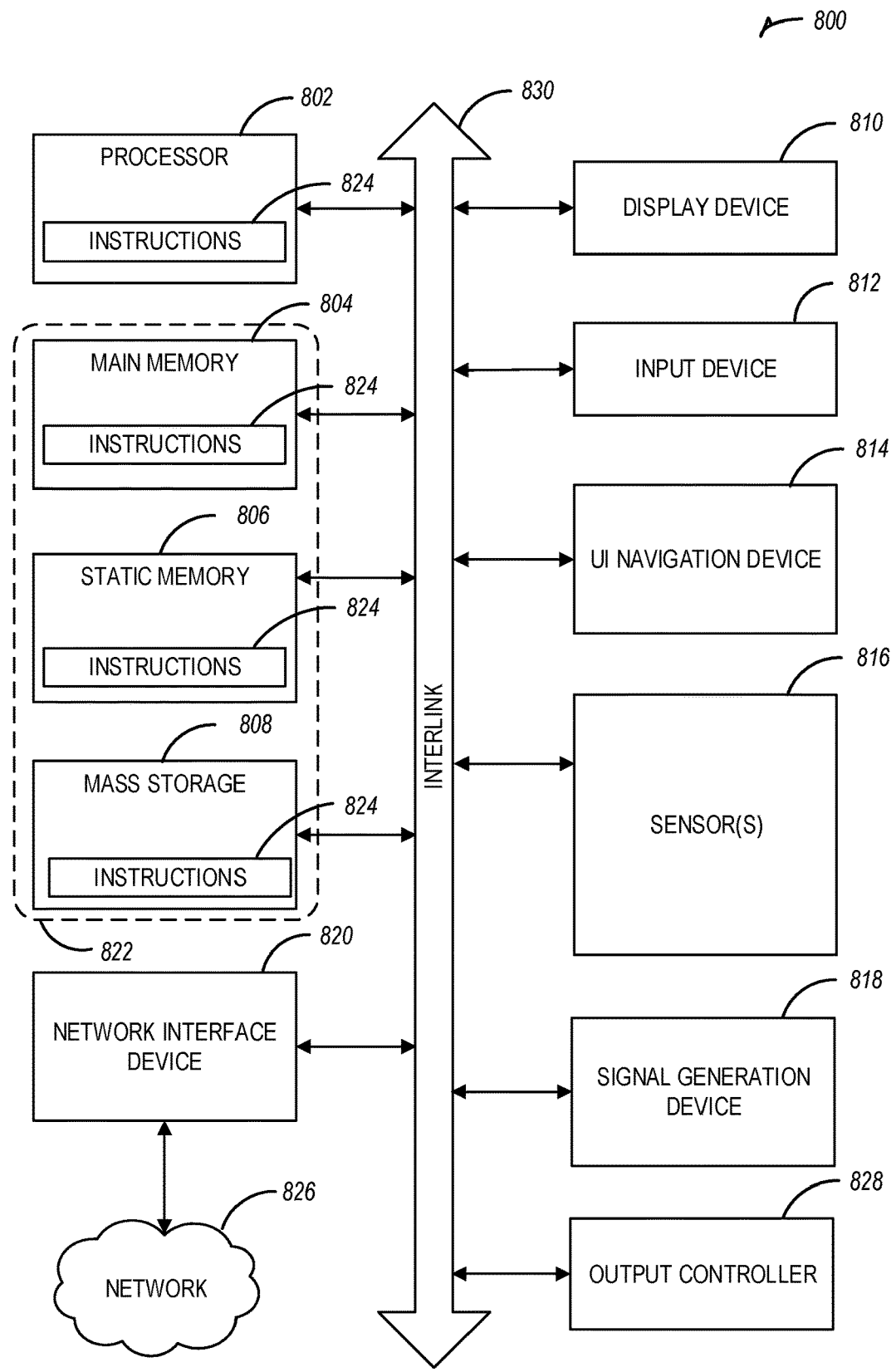
FIG. 8 is a block diagram illustrating an example of a machine upon which one or more embodiments may be implemented.

FIG. 8 illustrates a block diagram of an example machine 800 upon which any one or more of the techniques (e.g., methodologies) discussed herein may perform. Examples, as described herein, may include, or may operate by, logic or a number of components, or mechanisms in the machine 800. Circuitry (e.g., processing circuitry) is a collection of circuits implemented in tangible entities of the machine 800 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 800 follow.

In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 800 may include a hardware processor 802 (e.g., a central processing unit (CPU), a graphics processing unit (GPU), a hardware processor core, or any combination thereof), a main memory 804, a static memory (e.g., memory or storage for firmware, microcode, a basic-input-output (BIOS), unified extensible firmware interface (UEFI), etc.) 806, and mass storage 808 (e.g., hard drives, tape drives, flash storage, or other block devices) some or all of which may communicate with each other via a link (e.g., bus or interconnect) 830. The machine 800 may further include a display unit 810, an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 808, a signal generation device 818 (e.g., a speaker), a network interface device 820, and one or more sensors 816, such as a global positioning system (GPS) sensor, compass, accelerometer, gyrometer, magnetometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 802, the main memory 804, the static memory 806, or the mass storage 808 may be, or include, a machine readable medium 822 on which is stored one or more sets of data structures or instructions 824 (e.g., software) embodying or utilized by any one or more of the techniques or functions described herein. The instructions 824 may also reside, completely or at least partially, within any of registers of the processor 802, the main memory 804, the static memory 806, or the mass storage 808 during execution thereof by the machine 800. In an example, one or any combination of the hardware processor 802, the main memory 804, the static memory 806, or the mass storage 808 may constitute the machine readable media 822. While the machine readable medium 822 is illustrated as a single medium, the term "machine readable medium" may include a single medium or multiple media (e.g., a centralized or distributed database, and/or associated caches and servers) configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 822 may be representative of the instructions 824, such as instructions 824 themselves or a format from which the instructions 824 may be derived. This format from which the instructions 824 may be derived may include source code, encoded instructions (e.g., in compressed or encrypted form), packaged instructions (e.g., split into multiple packages), or the like. The information representative of the instructions 824 in the machine readable medium 822 may be processed by processing circuitry into the instructions to implement any of the operations discussed herein. For example, deriving the instructions 824 from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 824.

In an example, the derivation of the instructions 824 may include assembly, compilation, or interpretation of the information (e.g., by the processing circuitry) to create the instructions 824 from some intermediate or preprocessed format provided by the machine readable medium 822. The information, when provided in multiple parts, may be combined, unpacked, and modified to create the instructions 824. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 824 may be further transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., 4G/5G cellular networks), Plain Old Telephone (POTS) networks, and wireless data networks (e.g., Institute of Electrical and Electronics Engineers (IEEE) 802.11 family of standards known as Wi-Fi®, satellite communications), IEEE 802.15.4 family of standards, peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software. A transmission medium is a machine readable medium.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

In view of the disclosure above, a listing of various examples of embodiments is set forth below. It should be noted that one or more features of an example, taken in isolation or combination, should be considered to be within the disclosure of this application.

Example 1 is a method for measuring performance of a test scenario used in testing an autonomous driving safety requirement, the method comprising: defining a test environment for a test scenario, the test scenario used in a simulation of a test vehicle that tests compliance with at least one safety requirement including a minimum safe distance requirement, wherein the test environment is defined to specify characteristics of a roadway for the simulation; identifying test procedures to use in the test scenario, wherein the test procedures define actions for testing the minimum safe distance requirement in the simulation, and wherein the minimum safe distance requirement relates to a distance between the test vehicle and at least one other vehicle occurring in the simulation; identifying test parameters to use with the identified test procedures, wherein the test parameters define: (i) velocity, amount of braking, and timing of braking for the test vehicle, and (ii) velocity and rate of acceleration or deceleration for the at least one other vehicle; and creating the test scenario for use in an autonomous driving test simulator, wherein the test scenario applies the identified test procedures and the identified test parameters during the simulation of the defined test environment to identify a response of the test vehicle to the minimum safe distance requirement.

In Example 2, the subject matter of Example 1 optionally includes wherein the test scenario is a longitudinal car following scenario for the test vehicle following a target vehicle on a roadway, wherein the target vehicle applies maximum braking deceleration, and wherein the minimum safe distance requirement relates to a minimum safe longitudinal distance.

In Example 3, the subject matter of Example 2 optionally includes wherein the longitudinal car following scenario begins with the test vehicle and the target vehicle operating at a constant speed.

In Example 4, the subject matter of any one or more of Examples 2-3 optionally include wherein the longitudinal car following scenario begins with the test vehicle applying a maximum acceleration value and the target vehicle operating at a constant speed.

In Example 5, the subject matter of any one or more of Examples 2-4 optionally include defining logging parameters for the longitudinal car following scenario, the logging parameters including: a distance between the test vehicle and the target vehicle during a duration of the longitudinal car following scenario; a danger threshold time; a response time of the test vehicle; a maximum acceleration value of the test vehicle during the response time; and a minimum braking deceleration of the test vehicle after the response time.

In Example 6, the subject matter of any one or more of Examples 2-5 optionally include wherein the characteristics of the roadway, specified by the test environment, includes specifications for a curved roadway.

In Example 7, the subject matter of any one or more of Examples 2-6 optionally include wherein a test passing criteria for the longitudinal car following scenario includes meeting the following conditions simultaneously: i) a distance is maintained between the test vehicle and the target vehicle during a duration of the test scenario; ii) a response time of the test vehicle is equal to or smaller than a planned response time of the test vehicle; iii) a maximum acceleration value of the test vehicle is equal to or smaller than a planned maximum acceleration value of the test vehicle; and iv) a minimum braking value of the test vehicle during the response time is equal to or greater than a possible minimum braking value of the test vehicle, and the minimum braking value of the test vehicle after the response time is equal to or smaller than a maximum braking value of the test vehicle.

In Example 8, the subject matter of any one or more of Examples 2-7 optionally include setting an initial distance between the test vehicle and the target vehicle in the longitudinal car following scenario, wherein the initial distance is equal to or greater than the minimum safe longitudinal distance.

In Example 9, the subject matter of Example 8 optionally includes wherein the initial distance is set within a range between a minimum initial distance and a maximum initial distance, wherein the minimum initial distance is based on a requirement for the test scenario that a distance between the test vehicle and the target vehicle equals the minimum safe longitudinal distance when the test vehicle has started braking, and wherein the maximum initial distance is based on a requirement for the test scenario that a distance between the test vehicle and the target vehicle equals the minimum safe longitudinal distance when the target vehicle has finished braking.

In Example 10, the subject matter of Example 1 optionally includes wherein the test scenario is a cut-in scenario for a target vehicle performing a lateral motion towards a trajectory of the test vehicle, and wherein the minimum safe distance requirement relates to a minimum safe longitudinal distance between the target vehicle and the test vehicle.

In Example 11, the subject matter of any one or more of Examples 1-10 optionally include defining input parameters for the test scenario, the input parameters including: a response time of the test vehicle; a maximum acceleration value of the test vehicle; a minimum braking deceleration value of the test vehicle; a maximum velocity of the test vehicle; and a safe distance margin; wherein the test scenario further includes the defined input parameters within the simulation of the defined test environment.

In Example 12, the subject matter of any one or more of Examples 1-11 optionally include wherein the minimum safe distance requirement is defined by a vehicle operational safety model, wherein the test vehicle implements the vehicle operational safety model using planning and control functions of autonomous driving software.

In Example 13, the subject matter of Example 12 optionally includes causing execution of the test scenario in the autonomous driving test simulator, to verify compliance of planning and control functions of the autonomous driving software with the minimum safe distance requirement.

Example 14 is at least one machine-readable storage medium comprising instructions that, when executed by at least one processor, cause the at least one processor to perform the methods of any of Examples 1 to 13.

Example 15 is a system for measuring performance of a test scenario used in testing an autonomous driving safety requirement, the system comprising: at least one processing device configured to perform the methods of any of Examples 1 to 12, to produce a test scenario; at least one memory device configured to store the test scenario; and an autonomous driving test simulator configured to perform execution of the test scenario, and produce results of execution of the test scenario.

Example 16 is a computing system for autonomous vehicle test scenario evaluation, the computing system comprising: a memory to store data associated with a test scenario, the test scenario to be used in a simulation of a test vehicle that tests compliance with at least one safety requirement including a minimum safe distance requirement; and processing circuitry configured to: define a test environment for the test scenario, wherein the test environment specifies characteristics of a roadway for the simulation; identify test procedures to use in the test scenario, wherein the test procedures define actions for testing the minimum safe distance requirement in the simulation, and wherein the minimum safe distance requirement relates to a distance between the test vehicle and at least one other vehicle occurring in the simulation; identify test parameters to use with the identified test procedures, wherein the test parameters define: (i) velocity, amount of braking, and timing of braking for the test vehicle, and (ii) velocity and rate of acceleration or deceleration for the at least one other vehicle; and provide the test scenario for use in an autonomous driving test simulator, wherein the test scenario applies the identified test procedures and the identified test parameters during the simulation of the defined test environment, to identify a response of the test vehicle to the minimum safe distance requirement.

In Example 17, the subject matter of Example 16 optionally includes wherein the test scenario is a longitudinal car following scenario for the test vehicle following a target vehicle on a roadway, wherein the target vehicle applies maximum braking deceleration, and wherein the minimum safe distance requirement relates to a minimum safe longitudinal distance.

In Example 18, the subject matter of Example 17 optionally includes wherein the longitudinal car following scenario begins with the test vehicle and the target vehicle operating at a constant speed.

In Example 19, the subject matter of any one or more of Examples 17-18 optionally include wherein the longitudinal car following scenario begins with the test vehicle applying a maximum acceleration value and the target vehicle operating at a constant speed.

In Example 20, the subject matter of any one or more of Examples 17-19 optionally include the processing circuitry further configured to: define logging parameters for the longitudinal car following scenario, the logging parameters including: a distance between the test vehicle and the target vehicle during a duration of the longitudinal car following scenario; a danger threshold time; a response time of the test vehicle; a maximum acceleration value of the test vehicle during the response time; and a minimum braking deceleration of the test vehicle after the response time.

In Example 21, the subject matter of any one or more of Examples 17-20 optionally include wherein the characteristics of the roadway, specified by the test environment, includes specifications for a curved roadway.

In Example 22, the subject matter of any one or more of Examples 17-21 optionally include wherein a test passing criteria for the longitudinal car following scenario includes meeting the following conditions simultaneously: i) a distance is maintained between the test vehicle and the target vehicle during a duration of the test scenario; ii) a response time of the test vehicle is equal to or smaller than a planned response time of the test vehicle; iii) a maximum acceleration value of the test vehicle is equal to or smaller than a planned maximum acceleration value of the test vehicle; and iv) a minimum braking value of the test vehicle during the response time is equal to or greater than a possible minimum braking value of the test vehicle, and the minimum braking value of the test vehicle after the response time is equal to or smaller than a maximum braking value of the test vehicle.

In Example 23, the subject matter of any one or more of Examples 17-22 optionally include the processing circuitry further configured to: set an initial distance between the test vehicle and the target vehicle in the longitudinal car following scenario, wherein the initial distance is equal to or greater than the minimum safe longitudinal distance.

In Example 24, the subject matter of Example 23 optionally includes wherein the initial distance is set within a range between a minimum initial distance and a maximum initial distance, wherein the minimum initial distance is based on a requirement for the test scenario that a distance between the test vehicle and the target vehicle equals the minimum safe longitudinal distance when the test vehicle has started braking, and wherein the maximum initial distance is based on a requirement for the test scenario that a distance between the test vehicle and the target vehicle equals the minimum safe longitudinal distance when the target vehicle has finished braking.

In Example 25, the subject matter of Example 16 optionally includes wherein the test scenario is a cut-in scenario for a target vehicle performing a lateral motion towards a trajectory of the test vehicle, and wherein the minimum safe distance requirement relates to a minimum safe longitudinal distance between the target vehicle and the test vehicle.

In Example 26, the subject matter of any one or more of Examples 16-25 optionally include the processing circuitry further configured to: define input parameters for the test scenario, the input parameters including: a response time of the test vehicle; a maximum acceleration value of the test vehicle; a minimum braking deceleration value of the test vehicle; a maximum velocity of the test vehicle; and a safe distance margin; wherein the test scenario further includes the defined input parameters within the simulation of the defined test environment.

In Example 27, the subject matter of any one or more of Examples 16-26 optionally include wherein the minimum safe distance requirement is defined by a vehicle operational safety model, wherein the test vehicle implements the vehicle operational safety model using planning and control functions of autonomous driving software.

Example 28 is at least one machine-readable storage medium comprising instructions that, when executed by processing circuitry of a machine, cause the processing circuitry to: define a test environment for a test scenario, the test scenario used in a simulation of a test vehicle that tests compliance with at least one safety requirement including a minimum safe distance requirement, wherein the test environment is defined to specify characteristics of a roadway for the simulation; identify test procedures to use in the test scenario, wherein the test procedures define actions for testing the minimum safe distance requirement in the simulation, and wherein the minimum safe distance requirement relates to a distance between the test vehicle and at least one other vehicle occurring in the simulation; identify test parameters to use with the identified test procedures, wherein the test parameters define: (i) velocity, amount of braking, and timing of braking for the test vehicle, and (ii) velocity and rate of acceleration or deceleration for the at least one other vehicle; and provide the test scenario for use in an autonomous driving test simulator, wherein the test scenario applies the identified test procedures and the identified test parameters during the simulation of the defined test environment, to identify a response of the test vehicle to the minimum safe distance requirement.

In Example 29, the subject matter of Example 28 optionally includes wherein the test scenario is a longitudinal car following scenario for the test vehicle following a target vehicle on a roadway, wherein the target vehicle applies maximum braking deceleration, and wherein the minimum safe distance requirement relates to a minimum safe longitudinal distance.

In Example 30, the subject matter of Example 29 optionally includes wherein the longitudinal car following scenario begins with the test vehicle and the target vehicle operating at a constant speed.

In Example 31, the subject matter of any one or more of Examples 29-30 optionally include wherein the longitudinal car following scenario begins with the test vehicle applying a maximum acceleration value and the target vehicle operating at a constant speed.

In Example 32, the subject matter of any one or more of Examples 29-31 optionally include wherein the instructions further cause the processing circuitry to: define logging parameters for the longitudinal car following scenario, the logging parameters including: a distance between the test vehicle and the target vehicle during a duration of the longitudinal car following scenario; a danger threshold time; a response time of the test vehicle; a maximum acceleration value of the test vehicle during the response time; and a minimum braking deceleration of the test vehicle after the response time.

In Example 33, the subject matter of any one or more of Examples 29-32 optionally include wherein the characteristics of the roadway, specified by the test environment, includes specifications for a curved roadway.

In Example 34, the subject matter of any one or more of Examples 29-33 optionally include wherein a test passing criteria for the longitudinal car following scenario includes meeting the following conditions simultaneously: i) a distance is maintained between the test vehicle and the target vehicle during a duration of the test scenario; ii) a response time of the test vehicle is equal to or smaller than a planned response time of the test vehicle; iii) a maximum acceleration value of the test vehicle is equal to or smaller than a planned maximum acceleration value of the test vehicle; and iv) a minimum braking value of the test vehicle during the response time is equal to or greater than a possible minimum braking value of the test vehicle, and the minimum braking value of the test vehicle after the response time is equal to or smaller than a maximum braking value of the test vehicle.

In Example 35, the subject matter of any one or more of Examples 29-34 optionally include wherein the instructions further cause the processing circuitry to: set an initial distance between the test vehicle and the target vehicle in the longitudinal car following scenario, wherein the initial distance is equal to or greater than the minimum safe longitudinal distance.

In Example 36, the subject matter of Example 35 optionally includes wherein the initial distance is set within a range between a minimum initial distance and a maximum initial distance, wherein the minimum initial distance is based on a requirement for the test scenario that a distance between the test vehicle and the target vehicle equals the minimum safe longitudinal distance when the test vehicle has started braking, and wherein the maximum initial distance is based on a requirement for the test scenario that a distance between the test vehicle and the target vehicle equals the minimum safe longitudinal distance when the target vehicle has finished braking.

In Example 37, the subject matter of Example 28 optionally includes wherein the test scenario is a cut-in scenario for a target vehicle performing a lateral motion towards a trajectory of the test vehicle, and wherein the minimum safe distance requirement relates to a minimum safe longitudinal distance between the target vehicle and the test vehicle.

In Example 38, the subject matter of any one or more of Examples 28-37 optionally include wherein the instructions further cause the processing circuitry to: define input parameters for the test scenario, the input parameters including: a response time of the test vehicle; a maximum acceleration value of the test vehicle; a minimum braking deceleration value of the test vehicle; a maximum velocity of the test vehicle; and a safe distance margin; wherein the test scenario further includes the defined input parameters within the simulation of the defined test environment.

In Example 39, the subject matter of any one or more of Examples 28-38 optionally include wherein the minimum safe distance requirement is defined by a vehicle operational safety model, wherein the test vehicle implements the vehicle operational safety model using planning and control functions of autonomous driving software.

Example 40 is a system, comprising: means for defining a test environment for a test scenario, the test scenario used in a simulation of a test vehicle that tests compliance with at least one safety requirement including a minimum safe distance requirement, wherein the test environment is defined to specify characteristics of a roadway for the simulation; means for identifying test procedures to use in the test scenario, wherein the test procedures define actions for testing the minimum safe distance requirement in the simulation, and wherein the minimum safe distance requirement relates to a distance between the test vehicle and at least one other vehicle occurring in the simulation; means for identifying test parameters to use with the identified test procedures, wherein the test parameters define: (i) velocity, amount of braking, and timing of braking for the test vehicle, and (ii) velocity and rate of acceleration or deceleration for the at least one other vehicle; and means for outputting the test scenario for use in an autonomous driving test simulator, wherein the test scenario applies the identified test procedures and the identified test parameters during the simulation of the defined test environment, to identify a response of the test vehicle to the minimum safe distance requirement.

In Example 41, the subject matter of Example 40 optionally includes wherein the test scenario is a longitudinal car following scenario for the test vehicle following a target vehicle on a roadway, wherein the target vehicle applies maximum braking deceleration, and wherein the minimum safe distance requirement relates to a minimum safe longitudinal distance, and wherein the longitudinal car following scenario begins with: the test vehicle and the target vehicle operating at a constant speed, or the test vehicle applying a maximum acceleration value and the target vehicle operating at a constant speed.

In Example 42, the subject matter of Example 41 optionally includes means for defining logging parameters for the longitudinal car following scenario, the logging parameters including: a distance between the test vehicle and the target vehicle during a duration of the longitudinal car following scenario; a danger threshold time; a response time of the test vehicle; a maximum acceleration value of the test vehicle during the response time; and a minimum braking deceleration of the test vehicle after the response time.

In Example 43, the subject matter of Example 42 optionally includes means for defining the characteristics of the roadway, specified by the test environment, wherein the characteristics of the roadway include specifications for a curved roadway.

In Example 44, the subject matter of any one or more of Examples 41-43 optionally include means for defining a test passing criteria for the longitudinal car following scenario, the test passing criteria includes meeting the following conditions simultaneously: i) a distance is maintained between the test vehicle and the target vehicle during a duration of the test scenario; ii) a response time of the test vehicle is equal to or smaller than a planned response time of the test vehicle; iii) a maximum acceleration value of the test vehicle is equal to or smaller than a planned maximum acceleration value of the test vehicle; and iv) a minimum braking value of the test vehicle during the response time is equal to or greater than a possible minimum braking value of the test vehicle, and the minimum braking value of the test vehicle after the response time is equal to or smaller than a maximum braking value of the test vehicle.

In Example 45, the subject matter of any one or more of Examples 41-44 optionally include means for setting an initial distance between the test vehicle and the target vehicle in the longitudinal car following scenario, wherein the initial distance is equal to or greater than the minimum safe longitudinal distance.

In Example 46, the subject matter of Example 45 optionally includes means for establishing the initial distance within a range between a minimum initial distance and a maximum initial distance, wherein the minimum initial distance is based on a requirement for the test scenario that a distance between the test vehicle and the target vehicle equals the minimum safe longitudinal distance when the test vehicle has started braking, and wherein the maximum initial distance is based on a requirement for the test scenario that a distance between the test vehicle and the target vehicle equals the minimum safe longitudinal distance when the target vehicle has finished braking.

In Example 47, the subject matter of Example 40 optionally includes wherein the test scenario is a cut-in scenario for a target vehicle performing a lateral motion towards a trajectory of the test vehicle, and wherein the minimum safe distance requirement relates to a minimum safe longitudinal distance between the target vehicle and the test vehicle.

In Example 48, the subject matter of Example 47 optionally includes means for defining input parameters for the test scenario, the input parameters including: a response time of the test vehicle; a maximum acceleration value of the test vehicle; a minimum braking deceleration value of the test vehicle; a maximum velocity of the test vehicle; and a safe distance margin; wherein the test scenario further includes the defined input parameters within the simulation of the defined test environment.

In Example 49, the subject matter of any one or more of Examples 40-48 optionally include means for identifying the minimum safe distance requirement from a vehicle operational safety model, wherein the test vehicle implements the vehicle operational safety model using planning and control functions of autonomous driving software.

In Example 50, the subject matter of Example 49 optionally includes means for executing the test scenario in the autonomous driving test simulator, to verify compliance of planning and control functions of the autonomous driving software with the minimum safe distance requirement.

Although these implementations have been described with reference to specific exemplary aspects, it will be evident that various modifications and changes may be made to these aspects without departing from the broader scope of the present disclosure.

What is claimed is:

1. A method for measuring performance of a test scenario used in testing an autonomous driving safety requirement, the method comprising:
    defining a test environment for a test scenario, the test scenario used in a simulation of a test vehicle that tests compliance with at least one safety requirement including a minimum safe distance requirement, wherein the test environment is defined to specify characteristics of a roadway for the simulation;
    defining input parameters for the test scenario, the input parameters including:
        a response time of the test vehicle;
        a maximum acceleration value of the test vehicle;
        a minimum braking deceleration value of the test vehicle;
        a maximum velocity of the test vehicle; and
        a safe distance margin;
    identifying test procedures to use in the test scenario, wherein the test procedures define actions for testing the minimum safe distance requirement in the simulation, and wherein the minimum safe distance requirement relates to a distance between the test vehicle and at least one other vehicle occurring in the simulation;
    identifying test parameters to use with the identified test procedures, wherein the test parameters define: (i) velocity, amount of braking, and timing of braking for the test vehicle, and (ii) velocity and rate of acceleration or deceleration for the at least one other vehicle; and
    creating the test scenario for use in an autonomous driving test simulator, wherein the test scenario applies the identified test procedures and the identified test parameters during the simulation of the defined test environment to identify a response of the test vehicle to the minimum safe distance requirement, and wherein the test scenario further includes the defined input parameters within the simulation of the defined test environment.

2. The method of claim 1, wherein the test scenario is a longitudinal car following scenario for the test vehicle following a target vehicle on the roadway, wherein the target vehicle applies maximum braking deceleration, and wherein the minimum safe distance requirement relates to a minimum safe longitudinal distance.

3. The method of claim 2, wherein the longitudinal car following scenario begins with the test vehicle and the target vehicle operating at a constant speed.

4. The method of claim 2, wherein the longitudinal car following scenario begins with the test vehicle applying the maximum acceleration value and the target vehicle operating at a constant speed.

5. The method of claim 2, further comprising:
    defining logging parameters for the longitudinal car following scenario, the logging parameters including:
        a distance between the test vehicle and the target vehicle during a duration of the longitudinal car following scenario;
        a danger threshold time;
        the response time of the test vehicle;
        the maximum acceleration value of the test vehicle during the response time; and
        the minimum braking deceleration value of the test vehicle after the response time.

6. The method of claim 2, wherein the characteristics of the roadway, specified by the test environment, includes specifications for a curved roadway.

7. The method of claim 2, wherein a test passing criteria for the longitudinal car following scenario includes meeting the following conditions simultaneously:
    i) a distance is maintained between the test vehicle and the target vehicle during a duration of the test scenario;
    ii) a response time of the test vehicle is equal to or smaller than a planned response time of the test vehicle;
    iii) a maximum acceleration value of the test vehicle is equal to or smaller than a planned maximum acceleration value of the test vehicle; and
    iv) a minimum braking value of the test vehicle during the response time is equal to or greater than a possible minimum braking value of the test vehicle, and the minimum braking value of the test vehicle after the response time is equal to or smaller than a maximum braking value of the test vehicle.

8. The method of claim 2, further comprising:
    setting an initial distance between the test vehicle and the target vehicle in the longitudinal car following scenario, wherein the initial distance is equal to or greater than the minimum safe longitudinal distance.

9. The method of claim 8, wherein the initial distance is set within a range between a minimum initial distance and a maximum initial distance,
    wherein the minimum initial distance is based on a requirement for the test scenario that a distance between the test vehicle and the target vehicle equals the minimum safe longitudinal distance when the test vehicle has started braking, and
    wherein the maximum initial distance is based on a requirement for the test scenario that a distance between the test vehicle and the target vehicle equals the minimum safe longitudinal distance when the target vehicle has finished braking.

10. The method of claim 1, wherein the test scenario is a cut-in scenario for a target vehicle performing a lateral motion towards a trajectory of the test vehicle, and wherein the minimum safe distance requirement relates to a minimum safe longitudinal distance between the target vehicle and the test vehicle.

11. The method of claim 1, wherein the minimum safe distance requirement is defined by a vehicle operational safety model, wherein the test vehicle implements the vehicle operational safety model using planning and control functions of autonomous driving software.

12. The method of claim 11, further comprising:
causing execution of the test scenario in the autonomous driving test simulator, to verify compliance of planning and control functions of the autonomous driving software with the minimum safe distance requirement.

13. A computing system for autonomous vehicle test scenario evaluation, the computing system comprising:
a memory to store data associated with a test scenario, the test scenario to be used in a simulation of a test vehicle that tests compliance with at least one safety requirement including a minimum safe distance requirement; and
processing circuitry configured to:
define a test environment for the test scenario, wherein the test environment specifies characteristics of a roadway for the simulation;
define input parameters for the test scenario, the input parameters including:
a response time of the test vehicle;
a maximum acceleration value of the test vehicle;
a minimum braking deceleration value of the test vehicle;
a maximum velocity of the test vehicle; and
a safe distance margin;
identify test procedures to use in the test scenario, wherein the test procedures define actions for testing the minimum safe distance requirement in the simulation, and wherein the minimum safe distance requirement relates to a distance between the test vehicle and at least one other vehicle occurring in the simulation;
identify test parameters to use with the identified test procedures, wherein the test parameters define: (i) velocity, amount of braking, and timing of braking for the test vehicle, and (ii) velocity and rate of acceleration or deceleration for the at least one other vehicle; and
provide the test scenario for use in an autonomous driving test simulator, wherein the test scenario applies the identified test procedures and the identified test parameters during the simulation of the defined test environment, to identify a response of the test vehicle to the minimum safe distance requirement, and wherein the test scenario further includes the defined input parameters within the simulation of the defined test environment.

14. The computing system of claim 13, wherein the test scenario is a longitudinal car following scenario for the test vehicle following a target vehicle on the roadway, wherein the target vehicle applies maximum braking deceleration, and wherein the minimum safe distance requirement relates to a minimum safe longitudinal distance.

15. The computing system of claim 14, wherein the longitudinal car following scenario begins with the test vehicle and the target vehicle operating at a constant speed.

16. The computing system of claim 14, wherein the longitudinal car following scenario begins with the test vehicle applying the maximum acceleration value and the target vehicle operating at a constant speed.

17. The computing system of claim 14, the processing circuitry further configured to:
define logging parameters for the longitudinal car following scenario, the logging parameters including:
a distance between the test vehicle and the target vehicle during a duration of the longitudinal car following scenario;
a danger threshold time;
the response time of the test vehicle;
the maximum acceleration value of the test vehicle during the response time; and
the minimum braking deceleration value of the test vehicle after the response time.

18. The computing system of claim 14, wherein the characteristics of the roadway, specified by the test environment, includes specifications for a curved roadway.

19. The computing system of claim 14, wherein a test passing criteria for the longitudinal car following scenario includes meeting the following conditions simultaneously:
i) a distance is maintained between the test vehicle and the target vehicle during a duration of the test scenario;
ii) a response time of the test vehicle is equal to or smaller than a planned response time of the test vehicle;
iii) a maximum acceleration value of the test vehicle is equal to or smaller than a planned maximum acceleration value of the test vehicle; and
iv) a minimum braking value of the test vehicle during the response time is equal to or greater than a possible minimum braking value of the test vehicle, and the minimum braking value of the test vehicle after the response time is equal to or smaller than a maximum braking value of the test vehicle.

20. The computing system of claim 14, the processing circuitry further configured to:
set an initial distance between the test vehicle and the target vehicle in the longitudinal car following scenario, wherein the initial distance is equal to or greater than the minimum safe longitudinal distance.

21. The computing system of claim 20, wherein the initial distance is set within a range between a minimum initial distance and a maximum initial distance,
wherein the minimum initial distance is based on a requirement for the test scenario that a distance between the test vehicle and the target vehicle equals the minimum safe longitudinal distance when the test vehicle has started braking, and
wherein the maximum initial distance is based on a requirement for the test scenario that a distance between the test vehicle and the target vehicle equals the minimum safe longitudinal distance when the target vehicle has finished braking.

22. The computing system of claim 13, wherein the test scenario is a cut-in scenario for a target vehicle performing a lateral motion towards a trajectory of the test vehicle, and wherein the minimum safe distance requirement relates to a minimum safe longitudinal distance between the target vehicle and the test vehicle.

23. The computing system of claim 13, wherein the minimum safe distance requirement is defined by a vehicle operational safety model, wherein the test vehicle implements the vehicle operational safety model using planning and control functions of autonomous driving software.

24. At least one non-transitory machine-readable storage medium comprising instructions that, when executed by processing circuitry of a machine, cause the processing circuitry to:

define a test environment for a test scenario, the test scenario used in a simulation of a test vehicle that tests compliance with at least one safety requirement including a minimum safe distance requirement, wherein the test environment is defined to specify characteristics of a roadway for the simulation;

define input parameters for the test scenario, the input parameters including:
 a response time of the test vehicle;
 a maximum acceleration value of the test vehicle;
 a minimum braking deceleration value of the test vehicle;
 a maximum velocity of the test vehicle; and
 a safe distance margin;

identify test procedures to use in the test scenario, wherein the test procedures define actions for testing the minimum safe distance requirement in the simulation, and wherein the minimum safe distance requirement relates to a distance between the test vehicle and at least one other vehicle occurring in the simulation;

identify test parameters to use with the identified test procedures, wherein the test parameters define: (i) velocity, amount of braking, and timing of braking for the test vehicle, and (ii) velocity and rate of acceleration or deceleration for the at least one other vehicle; and provide the test scenario for use in an autonomous driving test simulator, wherein the test scenario applies the identified test procedures and the identified test parameters during the simulation of the defined test environment, to identify a response of the test vehicle to the minimum safe distance requirement, and wherein the test scenario further includes the defined input parameters within the simulation of the defined test environment.

25. The at least one non-transitory machine-readable storage medium of claim 24, wherein the test scenario is a longitudinal car following scenario for the test vehicle following a target vehicle on the roadway, wherein the target vehicle applies maximum braking deceleration, and wherein the minimum safe distance requirement relates to a minimum safe longitudinal distance.

26. The at least one non-transitory machine-readable storage medium of claim 24, wherein the test scenario is a cut-in scenario for a target vehicle performing a lateral motion towards a trajectory of the test vehicle, and wherein the minimum safe distance requirement relates to a minimum safe longitudinal distance between the target vehicle and the test vehicle.

* * * * *